United States Patent [19]

Jones et al.

[11] Patent Number: 4,689,541

[45] Date of Patent: Aug. 25, 1987

[54] METHOD AND APPARATUS FOR CONTROLLING MULTIPLE MOTORS

[75] Inventors: Rollin G. Jones; Bert L. Kortegaard; David F. Jones, all of Los Alamos, N. Mex.

[73] Assignee: The United States of America as represented by the United States Department of Energy, Washington, D.C.

[21] Appl. No.: 888,313

[22] Filed: Jul. 22, 1986

[51] Int. Cl.⁴ .............................................. H02P 8/00
[52] U.S. Cl. ..................................... 318/696; 318/685
[58] Field of Search ......................... 318/696, 685, 4–8

[56] References Cited

U.S. PATENT DOCUMENTS

| | | | |
|---|---|---|---|
| 3,146,386 | 8/1964 | Gerber | 318/8 |
| 3,268,785 | 8/1966 | Gerber et al. | 318/8 X |
| 3,497,778 | 2/1970 | Gerber | 318/8 |
| 3,757,192 | 9/1973 | Asano et al. | 318/8 X |
| 4,294,552 | 10/1981 | Mako | 400/219.1 |
| 4,401,931 | 8/1983 | Kueteiman et al. | 318/696 |
| 4,481,569 | 11/1984 | Hoodbhoy | 364/183 |
| 4,509,114 | 4/1985 | Leininger et al. | 364/200 |

Primary Examiner—William M. Shoop, Jr.
Assistant Examiner—Saul M. Bergman
Attorney, Agent, or Firm—Ray G. Wilson; Judson R. Hightower

[57] ABSTRACT

A method and apparatus are provided for simultaneously controlling a plurality of stepper motors. Addressing circuitry generates address data for each motor in a periodic address sequence. Memory circuits respond to the address data for each motor by accessing a corresponding memory location containing a first operational data set functionally related to a direction for moving the motor, speed data, and rate of speed change. First logic circuits respond to the first data set to generate a motor step command. Second logic circuits respond to the command from the first logic circuits to generate a third data set for replacing the first data set in memory with a current operational motor status, which becomes the first data set when the motor is next addressed.

30 Claims, 16 Drawing Figures

METHOD AND APPARATUS FOR CONTROLLING MULTIPLE MOTORS

This invention is the result of a contract with the Department of Energy (Contract No. W-7405-ENG-36).

BACKGROUND OF INVENTION

This invention generally relates to a method and apparatus for controlling step motor operation and, more particularly, to a method and apparatus for simultaneously controlling a multiplicity of step motors having individual operating characteristics.

Step motors, or stepper motors, are motors which move in discrete increments. For example, four phase control windings may be provided which can be separately activated in response to inputs from a control system. By addressing the windings in a proper sequence a controllable incremental stepped revolution of the motor shaft is obtained. Thus, step motors are very useful in a control system for positioning mechanical components with a requisite accuracy.

In some instances a number of step motors are used to position component parts of a mechanism. Simultaneous control of the motors typically involves a microprocessor for manipulating data. In some operations a relatively complex computer may be used for the motor control. In other systems, a microprocessor may be associated with each motor for stepping the motor. A central control computer requires complex wiring and a comparatively slow operation is obtained to accommodate the time for data transfer and manipulation with the individual motors. Individual microprocessor applications require relatively complex and expensive control circuits for each motor.

Recent control systems have used programmable array logic circuits (PAL), also known as programmable logic array circuits (PLA), to logically combine selected inputs to obtain outputs for further processing by microprocessor circuitry. For example, U.S. Pat. No. 4,481,569 teaches use of a PAL for bookkeeping signal condition functions ancillary to microprocessor circuitry for controlling robotic servo motors. U.S. Pat. No. 4,509,114 teaches use of a PLA in a control system to interface between an instruction register and primary control circuitry. An operation code in an instruction register is inputted to a PLA to obtain a microword output related to a desired control action. The use of logic arrays taught by the subject patents is in combination with processing circuitry, with a single PAL (PLA) used to obtain a bookkeeping or a translation function.

Available systems for controlling more than one motor generally use a start/stop routine for addressing the motor phases to rotate the motor at an operating speed. Abrupt acceleration and the resulting forces can be significant during the start or the stop of the motor.

Thus, the circuit complexity of conventional systems limits the application of conventional systems to the control of a relatively small number of motors for simultaneous operation. Further, the start/stop characteristics of existing control systems limits the stepping speed for the motors to keep forces within acceptable limits. System operating speed is further limited by the time required for data manipulation and transfer within microprocessor controlled devices.

It is an object of the present invention to simultaneously control a large number of motors.

It is another object of the present invention to program motor acceleration to permit high speed operation without large acceleration forces.

One other object of the present invention is to pipeline data flow and manipulation for improved operating response characteristics.

Yet another object of the present invention is to enable the simultaneous control of a multiplicity of motors, each of which can have individual operating characteristics.

The disadvantages of the prior art are overcome by the present invention, however, and improved method and apparatus are provided for simultaneously controlling a multiplicity of step motors.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF INVENTION

To achieve the foregoing and other objects, and in accordance with the purposes of the present invention, as embodied and broadly described herein, the apparatus of this invention may comprise a motor control system for simultaneously controlling a plurality of stepper motors. An addressing means generates address data for each motor in a periodic address sequence. A memory means responds to the address data for each motor by accessing a memory location corresponding to the address data. The accessed memory location contains a first data set functionally related to a direction for moving the motor, a number of steps remaining for moving the motor, speed data for moving the number of steps, and rate of change data for the speed. First logic circuits are provided for inputting the first data set and for outputting a second data set for commanding the addressed motor to make a single step in a determined direction after a number of the periodic addresses of the motor. Second logic circuits provide for inputting the second data set and for outputting a third data set which is functionally related to a status of the motor after responding to the second data set. Circuit means then provide for replacing the first data set with the third data set in the memory at the location corresponding to the address of the motor. The third data set then becomes the first data set at the next periodic addressing of the motor.

In another embodiment of the present invention a method is provided for simultaneously controlling a plurality of stepper motors. Address data is generated for each of the motors in a periodic address sequence. A memory location is accessed which corresponds to the address data and contains a first data set for the addressed motor. The first data set is functionally related to a direction for moving the motor, a number of steps which remain for moving the motor, speed data for moving the number of steps, and rate of change data for the speed. The first data set is input to first logic circuits which output a second data set for commanding the motor to make a single step in a determined direction after a number of periodic motor addresses. The second data set is input to second logic circuits which output a third data set functionally related to a status of the motor in response to the second data set. The first data set is then replaced in the memory with the third data set at the location corresponding to the address of the motor. The third data set thereafter becomes the first data set at the next periodic addressing of the motor.

In yet another characterization of the present invention, a motor control system is provided for simultaneously controlling a plurality of stepper motors. A memory means defines a memory location for each of the plurality of motors for storing a first set of data functionally related to an operational status of each of the motors. A first plurality of programmable array logic (PAL) circuits manipulates the first set of data according to predetermined logic to derive a second set of data for moving each motor. Circuit means are provided for combining the second set of data with the first set of data to derive a third set of data which is functionally related to a revised operational status of each motor. Writing means thereafter replace the first data set in the memory with the third data set.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE DRAWINGS

Figure 1:
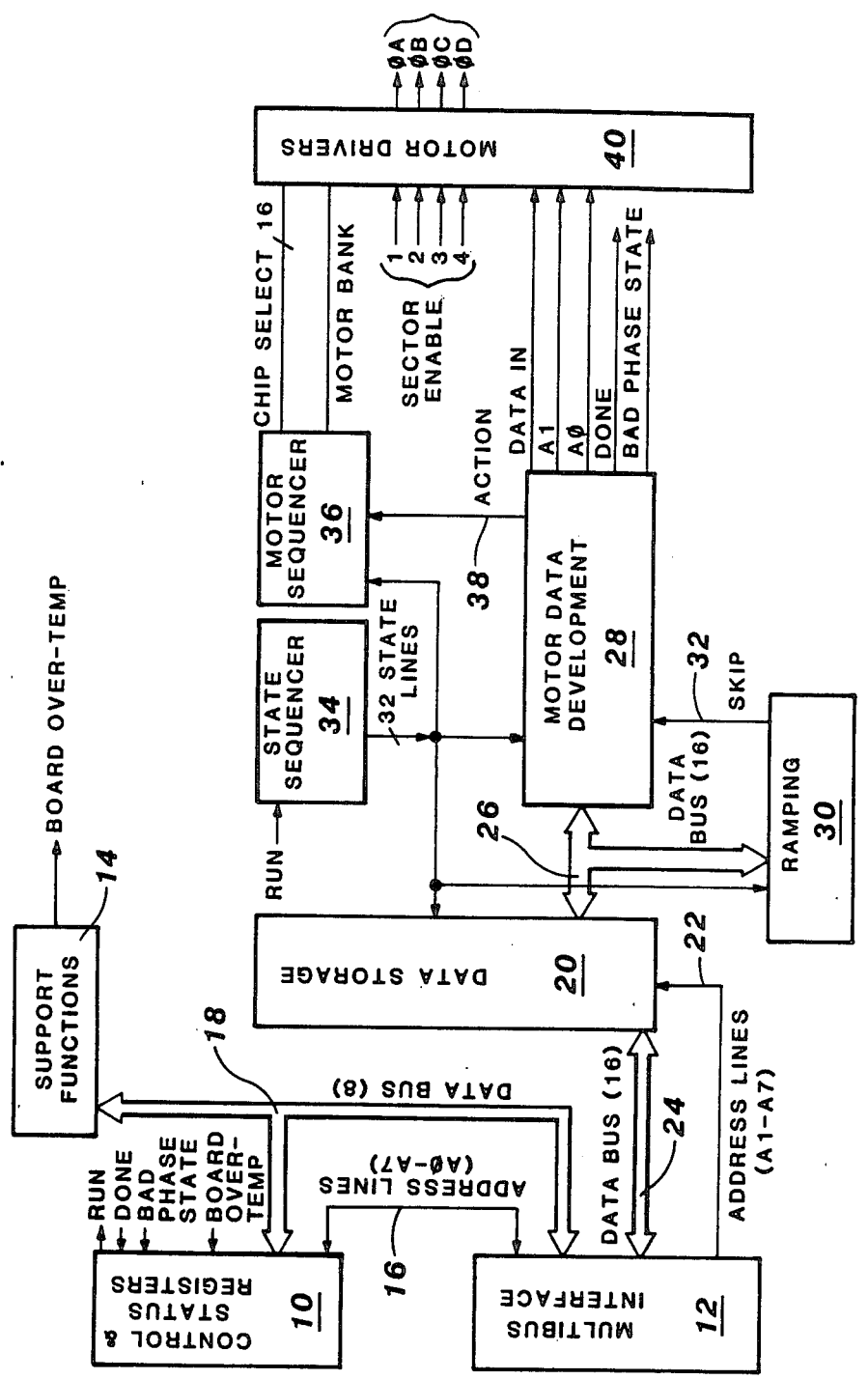
FIG. 1 is a functional block diagram of a system for simultaneously controlling a plurality of stepper motors.

FIG. 1 is a functional block diagram of one embodiment of the present invention. The system hereinafter described is illustrated for controlling 32 step motors, each of which includes four phase windings for discretely stepping the motor in response to digital commands. It will be understood that the specific number of step motors under control and the specific operating characteristics of each step motor are not limitations herein and are presented only for purposes of illustration.

Data storage 20 is provided as the memory system between circuits for generating motor movement data and circuits for monitoring and registering circuit performance to provide continuous and current motor status data. Control and status registers 10 communicate with support function circuits 14 and data storage 20 through data bus 18 and multibus interface 12. Address lines 16 (A0–A7) enable communications between multibus interface 12 and control and status registers 10. Inputs to control and status registers 10 include system malfunction information, such as a Bad Phase State or Board Over-Temp. A DONE input signal indicates that all of the motors have stepped to their designated locations. A RUN output is a basic enabling signal for State Sequencer 34, as hereinafter described.

Multibus interface 12 provides latch and buffer circuitry connecting address line 16 and data bus 18 with address lines 22 and data bus 24.

Data storage 20 provides a memory location block for each of the motors being controlled. The contents of each motor memory location block indicate the operating status of the particular motor: 1. the number of steps to be taken by that motor toward a new location; 2. the last phase state for the motor; 3. the contents of a skip counter for speed control; 4. a ramp level number for acceleration control; 5. the direction for motor movement; and 6. upper and lower speed limits for the motor.

Each memory location is loaded with a first data set prior to any motor movement. Thereafter, each motor is addressed in a periodic sequence, placing the addressed motor memory in communication with data bus 26. As hereinafter described, the contents of the addressed memory location are placed onto data bus 26 and updated by first logic circuits in motor data development block 28 and ramping block 30 to form a second data set. The second data set is then provided to second logic circuits in motor data development block 28 and ramping block 30 to obtain a third data set. The third data set is placed on data bus 26 and returned to data storage 20 to the memory location of the addressed motor. Thus, the third data set becomes the first data set when the motor is next addressed.

Data placed on data bus 26 are provided to motor data development circuits 28 and ramping circuits 30. State sequencer 34 then sequentially enables and clocks latches and logic circuits within motor data development block 28 and ramping block 30 to process the data on data bus 26 to data suitable for moving the addressed motor. A complete state sequence routine is completed by sequencer 34 each time a motor is addressed.

At the completion of a sequence routine, the system logic has enabled the addressed motor to accept a movement command, has determined whether a movement command (ACTION) is appropriate, and has provided data to motor drivers 40 for energizing a next set of phase windings to step the addressed motor in a determined direction. In addition, motor data development block 28 and ramping block 30 have updated internal counters and other motor status information. Thereafter sequencer 34 writes the updated third data set back into data storage 20 for use when the motor is next addressed.

Motor sequencer 36 enables motor movement when an ACTION signal is received on signal line 38. As shown, one of sectors 1, 2, 3 or 4 is enabled, with eight motors per sector. A CHIP SELECT signal enables the chip controlling the addressed motor. A MOTOR BANK signal further enables the appropriate one of the two motors controlled by each chip. Motor drivers 40 then supply power to the appropriate phase ($\Phi_a$, $\Phi_b$, $\Phi_c$, $\Phi_d$) to cause the addressed motor to make a single phase change in the required direction.

The detailed descriptions of FIGS. 2-16 refer to various internal signals by terms shown on the drawings. The following glossary of signal terms more particularly defines the terms used herein.

GLOSSARY OF TERMS

| Term | Definition |
|---|---|
| A0-A7 | Address lines. |
| ADD 1, ADD 2 | Data signals indicative of phase to be changed. |
| A/D EOC | Analog-to-digital end of conversion. |
| A/D READ | Digital data is read from converter. |
| A/D WRITE | Digital data is inputted to analog-to-digital converter for channel selection. |
| ACTION PULSE | Output to indicate that a motor phase change is to occur. |
| ADDECODE | Board address. |
| ALL ZEROS | All step counters output a zero count. |
| BAD PH STATE | Motor phase data is not a possible condition from present phase state. |
| BEGIN HV | Begin to supply high voltage for motor operation. |
| BD CYCLE | Flag occurring after each board cycle of all motors controlled by board. |
| BD OVER TEMP | High temperature condition sensed. |
| BD READ | Computer reads data from board. |
| BD WRITE | Computer writes data into board. |
| BHENABLE | Multibus signal to distinguish between 8- and 16-bit systems. |
| C1 PAL ENABLE | Enable C1 PAL to logically combine inputs. |
| C2 PAL ENABLE | Enable C2 PAL to logically combine inputs. |
| CLEAR 1 | Board reset. |
| CLEAR 2 | Board reset. |
| CLEAR FAULTS | Clear fault signals to continue. |
| CLEAR GARBAGE | Clear flags indicative of garbage, or illogical condition. |
| CLK ADD SEQ | Clock signal for advancing sequential memory addresser. |
| D CLOCK | Delayed clock. |
| CW LIMIT | Clockwise rotational limit. |
| CTR CW LIMIT | Counter clockwise rotational limit. |
| D0-D9/DA-DF | Data bus line identification to data buffers. |
| DATA IN | High if new phase state is on. |
| DATA HI LO ENABLE | Enable data buffer on data lines D0-D15. |
| DATA SWAP ENABLE | Enable either 8- or 16-bit data to be input. |
| DATA WRITE | Bring data onto data bus. |
| DIRECTION | Motor signal for CW or CTR CW rotation. |
| DISABLE INT ACCESS | Disable board memory access where board is not selected or write is disabled. |
| DONE | Signal that all motor movements are complete. |
| ENABLE PROM | Enables PROM to change speed level by programmed increments. |
| FAULT | An identified error condition to shut down high voltage to motors. |
| FAULT RETURN | Cleared fault signal. |
| 1st STEP | Initializing step. |
| GARBAGE | State of the board undefined and needs to be reset. |
| HALT | Output of C2PAL through board state control to halt board operation. |
| HALT REQ | Computer request for a board halt; can occur after a complete board cycle. |
| HI MEM BYTE ENABLE | Enable RAM memory with data lines D08-D15. |
| $I_1$-$I_4$ | Total current in each of the four motor sectors of eight motors each. |
| INH1/INH2 | Signals from multibus that will disable RAM and ROM at the same memory location as the board. |
| INTR RESET | Reset interrupt latches. |
| LATCH PHER | Phase error (bad phase) latch. |
| IOWC | Command to write data into board if board is strapped to be I/O mapped. |
| IORC | Command to read data from board if board is strapped to be I/O mapped. |
| LD0 | Buffered data line. |
| LO MEM BYTE ENABLE | Enable RAM memory with data lines D0-D7. |
| MB | Data bit to select one of two motors per chip in a motor bank. |
| MRC | Command for computer to read data from board if board is strapped to be memory mapped. |
| MWC | Command for computer to write data to board if board is strapped to be memory mapped. |
| MEM A,B,C BUS ENABLE | Enable respective memory for communication with data lines. |
| MEM A,B,C BUS DIS. | Disable respective memory from communication with data lines. |
| MEM READ | Command that allows computer to read from board memory. |
| MEM WRITE | Command that allows computer to write into board memory. |
| PAL CLOCKS | Clocks PAL input through logic steps. |
| PROG HALT | State reached when HALT arises during normal run interval. |
| PROGRAMMED | Data is available in system for use. |
| PS AC ON | Turn on motor voltage power supplies. |
| READY | Board is in condition to be programmed. |
| RESET STATE SEQ. | Signal after each board cycle to reset state, memory, and motor sequencers. |
| RUN | Board state after START command and where time delays have been executed to bring motor voltage to operating level. |
| RUN REQUEST | Flag corresponding to beginning of RUN state. |
| SET FAULTS | Software command to verify board response to faults. |
| SEC 1,2,3, or 4 ENABLE | Enable outputs from Sectors 1,2,3, or 4 to respective motors. |
| SKIP | Signal that no action is due during present data interval. |
| SPEED SOURCE | Speed data input from external switch or internal data. |
| START | Software command to board causing state sequence routine to start. |
| START DELAY | Timed delay to enable initial conditions and power to be established. |
| START ENABLED | Enable flag for program start when proper conditions exist. |
| START CONVERT | Start analog-to-digital conversion. |
| STATUS ENABLE | Enable status registers onto data bus to be read by computer. |
| SW VOLT INHIBIT | Software control of motor voltages. |
| TANK AIR FAULT | External input indicating insufficient cooling. |
| UP/DOWN | Indicates whether ramping should be up or down. |
| VOLTAGE TIME OUT | Timed delay to signal if board high voltage is not needed since inactive. |
| WR ENABLED | Enable board memory to be written to. |
| XACK/ | Multibus hand shake to acknowledge a |

| GLOSSARY OF TERMS |
|---|
| command. |

Figure 2:
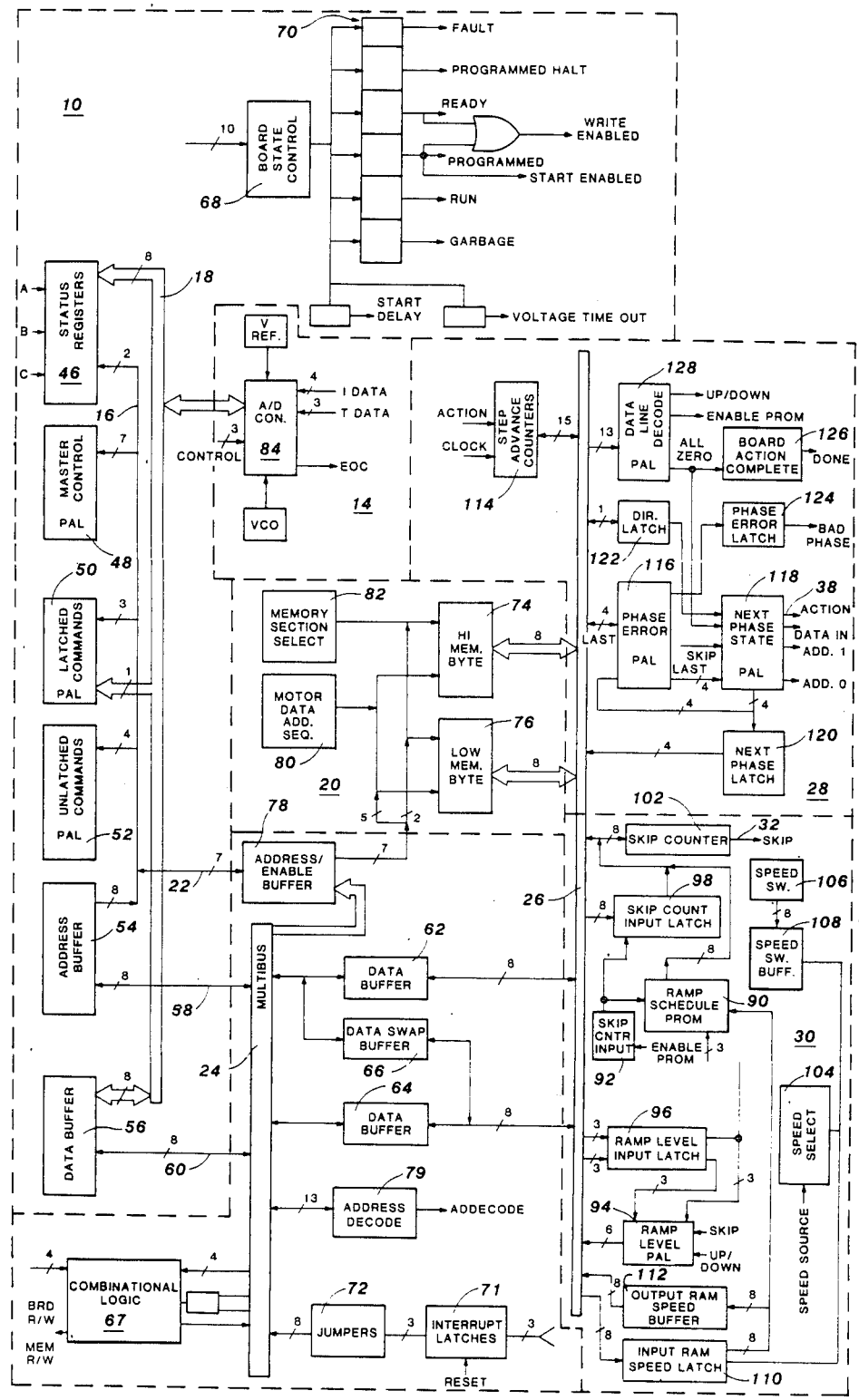
FIG. 2 illustrates one embodiment of the present invention as a schematic of the data processing system in functional block diagram format.

Referring now to FIG. 2, there are more particularly depicted block diagram schematics of the functional blocks depicted in FIG. 1. Control and status register circuits 10 include status register 46, which may conveniently have three input ports A, B, C for receiving output signals from various system sources indicative of the system operational status, the enablement signals, and any malfunction signals to derive an output to data bus 18. Three programmed array logic circuits (PAL) 48, 50, 52 are provided for logically processing the input signals.

Board state control 68 is also a PAL for logically processing selected outputs from PALs 48, 50, and 52 to set latches 70. The output of latches 70 provides flag and enabling signals to data logic circuitry as hereinafter discussed.

Finally, address buffer 54 and data buffer 56 communicate along address path 58 and data path 60, respectively, with multibus 24. Data signals along data bus 18 and address signals along address line 16 are input to multibus 24 through buffers 54 and 56.

Multibus interface 12 includes multibus 24 for accepting address signals and data from status and control register 10. Data buffers 62 and 64 communicate between multibus 24 and internal data bus 26 for data transfer. Multibus 24 also communicates with address enable buffer 78 to provide address information to data storage block 20, as hereinafter discussed. Data swap buffer 66 is provided to enable data to be processed in 8-bit format or 16-bit format from multibus 24 onto internal data bus 26 in 8-bit format.

Combinational logic 67 is within multibus interface block 12. Data source and read/write data is provided to combinational logic block 67 which enables the overall circuit board to read/write to adjacent systems and enable memory elements within data storage 20 to read/write on associated bus lines. Combinational logic 67 also detects an address code which places a motor control board in an operational condition.

Multibus interface 12 includes interrupt latches 71 with jumpers 72 to direct fault/interrupt outputs onto jumpered multibus 24 lines. Address decoding circuit 79 acts to decode information on multibus 24 to determine that a particular control board is operationally enabled.

Thus, multibus interface 12 transfers data between multibus 24 and internal data bus 26 and addresses motor memory locations within HI MEMORY BYTE 74 and LOW MEMORY BYTE 76. Motor data address sequencer 80 and memory section select 82 process inputs from state sequencer 34 (FIG. 1) to enable memory sections of memory units 74 and 76 to be written onto and read from internal data bus 26. Memory units 74 and 76 each have two memory sections, for a total of four memory block sections for each motor. As hereinafter explained, when each motor is addressed, the memory sections for that particular motor are enabled to read from and write on internal data bus 26.

Support function block 14 generates data to determine possible malfunction status of the control system. Analog-to-digital converter 84 receives analog temperature data from the circuit board and analog current data from the motor sectors. Converter 84 provides a digital output to data bus 18 indicative of a malfunction occurrence.

Once a motor is addressed, operational status data for the addressed motor is provided from memories 74, 76 to internal data bus 26. Data line decoder 128 is a PAL unit which monitors the data on data bus 26 to logically derive various status information. The data indicates whether the motor speed is going up or down and whether ramp schedule PROM 90 should be enabled to initiate an acceleration schedule. Further, if all of the counters are zero at the end of a board cycle, Board Action Complete circuit 126 outputs a DONE signal.

Phase Error PAL 116 receives data relating to the present motor phase state and data relating to the next motor phase state, as derived by Next Phase State PAL 118. If the next phase state is not compatible with the present phase state, a phase error signal is latched into latch 124 to indicate a Bad Phase condition. The data in memory units 74 and 76 also sets direction latch 122 for use by Next Phase State PAL 118 in logically deriving the next phase state for the addressed motor to assume. It will be noted that there is no output from PAL 118 unless an output is indicated by the SKIP input, hereinafter explained. Once a next phase has been determined it is latched in Next Phase latch 120 to form a portion of the third data set for return to Data Storage 20.

Ramping circuit 30 is a particular feature of the present control system. Ramping circuits 30 can obtain initial speed information from speed switch 106 through buffer 108 or from an alternate speed source through speed selector 104. Speed data is provided to input RAM speed latch 110 for initial input to ramp schedule PROM 90. Output RAM speed buffer 112 thereafter places speed data on data bus 26 for return and storage in memory 76.

It should be noted that the speed determination by ramping circuit 30 is provided through skip counter 102. A SKIP 32 output is obtained from counter 102 when counter 102 is in an overflow condition. Thus, the rate of output of SKIP signal 32 depends on a preload into skip counter 102. An initial preload count represents a minimum speed for the addressed motor. Thereafter, the count in skip counter 102 is incremented each time the motor is addressed.

The count within skip counter 102 is returned along data bus 26 for writing to memory board 20 when the address cycle is complete. The count data is read from memory 20 and returned to skip counter 102 at the next address cycle. Thus, the contents of skip counter 102 represent an incremented data count. Skip count input latch 98 latches data from data bus 26 for presentation to skip counter 102. The initial preload to skip counter 102 is provided by ramp schedule PROM 90. Thereafter the skip counter 102 data is updated from memory data on data bus 26 until an overflow condition exists. After SKIP 32 signal is output, the skip counter 102 is again preloaded from PROM 90. Skip counter input control 92 loads skip counter 102 from PROM 90 when PROM 90 is enabled for data processing. Control 92 thereafter provides updated count data from memory 20.

PROM 90 provides for increasing or decreasing the speed of stepping a selected motor in programmed increments:

TABLE A

| INCREMENTAL PROM SPEED CHANGES | |
|---|---|
| Ramp Level | % Maximum Speed |
| 1 | 22.20% |

TABLE A-continued

INCREMENTAL PROM SPEED CHANGES

| Ramp Level | % Maximum Speed |
|---|---|
| 2 | 41.66% |
| 3 | 58.33% |
| 4 | 72.20% |
| 5 | 83.33% |
| 6 | 91.66% |
| 7 | 97.22% |
| 8 | 100.00% |

In a preferred embodiment there are eight ramp levels within PROM 90. A change in ramp level occurs after a motor has taken a programmed number of steps at a present ramp level. The ramp level number is determined by ramp level PAL 94 which receives ramp level data which represents a present motor speed and prescaler data which determines the rate of change of motor speed. The selected prescaler data increments or decrements a ramp level number after a predetermined number of SKIP inputs have been counted. The UP-/DOWN input determines whether the present ramp level number is incremented or is decremented. Ramp level data is provided to data bus 26 for return to memory.

Thus, the SKIP 32 output generated by ramping circuits 30 indicates that a step is to be taken by the selected motor. As discussed above, SKIP signal 32 is presented to Next Phase State PAL 118 to enable an output to motor drivers 40 (FIG. 1) and to generate ACTION signal 38 indicating that a step is to be taken.

Figure 3:
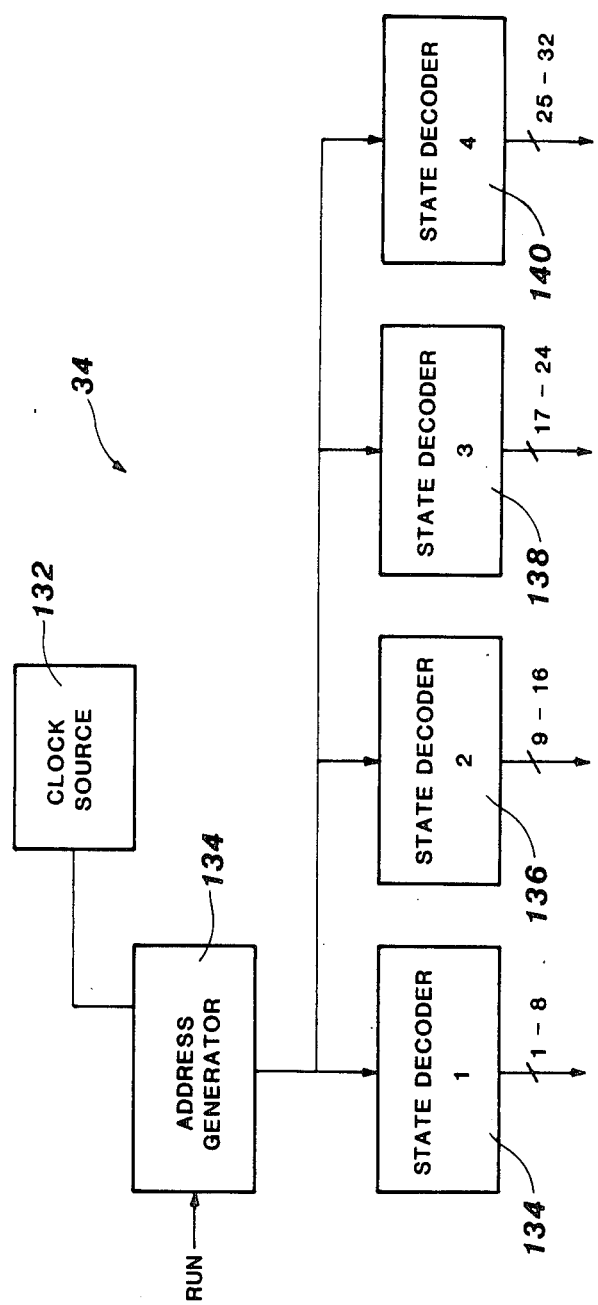
FIG. 3 is a block diagram of the state sequence generator depicted in FIG. 1.

Referring now to FIG. 3 there is shown in block diagram a schematic of State Sequence Generator 34. State Sequence Generator 34 has 32 outputs to enable a series of internal operations to occur in predetermined sequence. Address generator 134 is enabled by a RUN input and clocked by clock source 132. The addresses from generator 134 are provided to state decoders 134, 136, 138, 140 to provide an output on one of the 32 sequence lines. As hereinafter discussed, one entire sequence routine is generated each time a motor is addressed to provide for motor movement and/or memory update.

Figure 4:
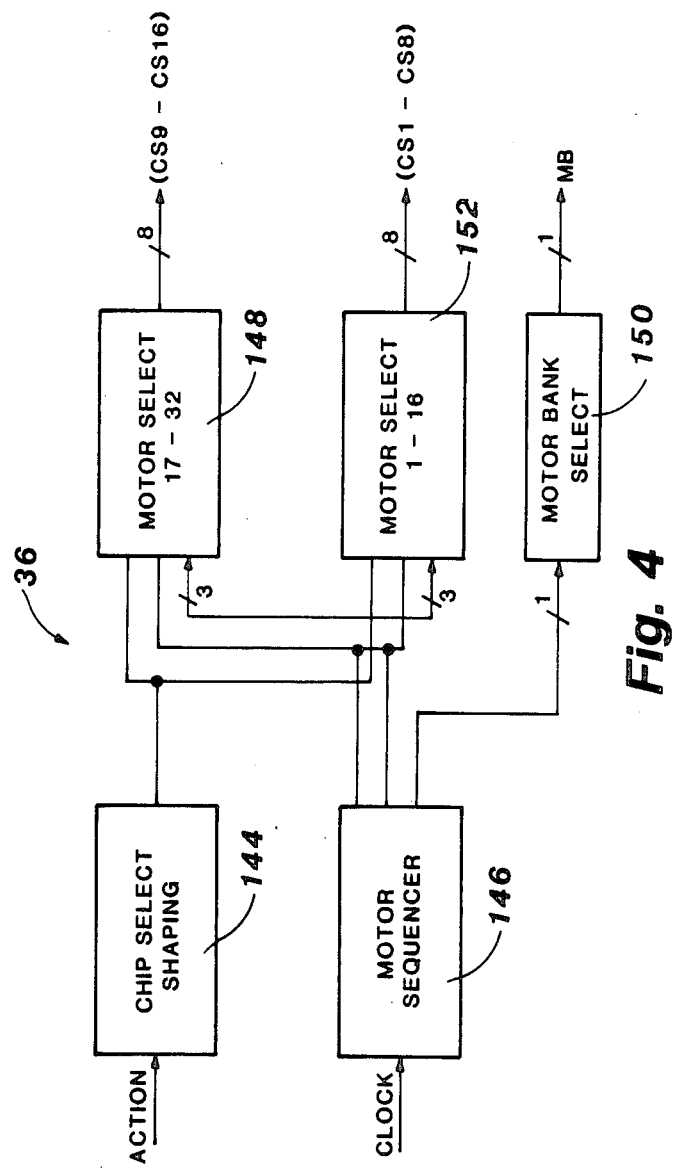
FIG. 4 is a block diagram of a motor sequencer depicted in FIG. 1.

A functional block diagram of the motor driver circuitry is provided in FIG. 4. An ACTION signal is provided to chip select shaping circuit 144 to indicate that a motor step is to be taken. Motor sequencer 146 has an input clock to step the output of motor sequencer 146 in a preselected manner. The output of motor sequencer 146 is provided to motor select circuits 148, 152 to address a particular motor control chip CS1-16. The selected chip controls two motors and motor bank select circuits 150 provide output MB to select a first motor and then a second motor controlled by one of the signals CS1-16.

Figure 5:
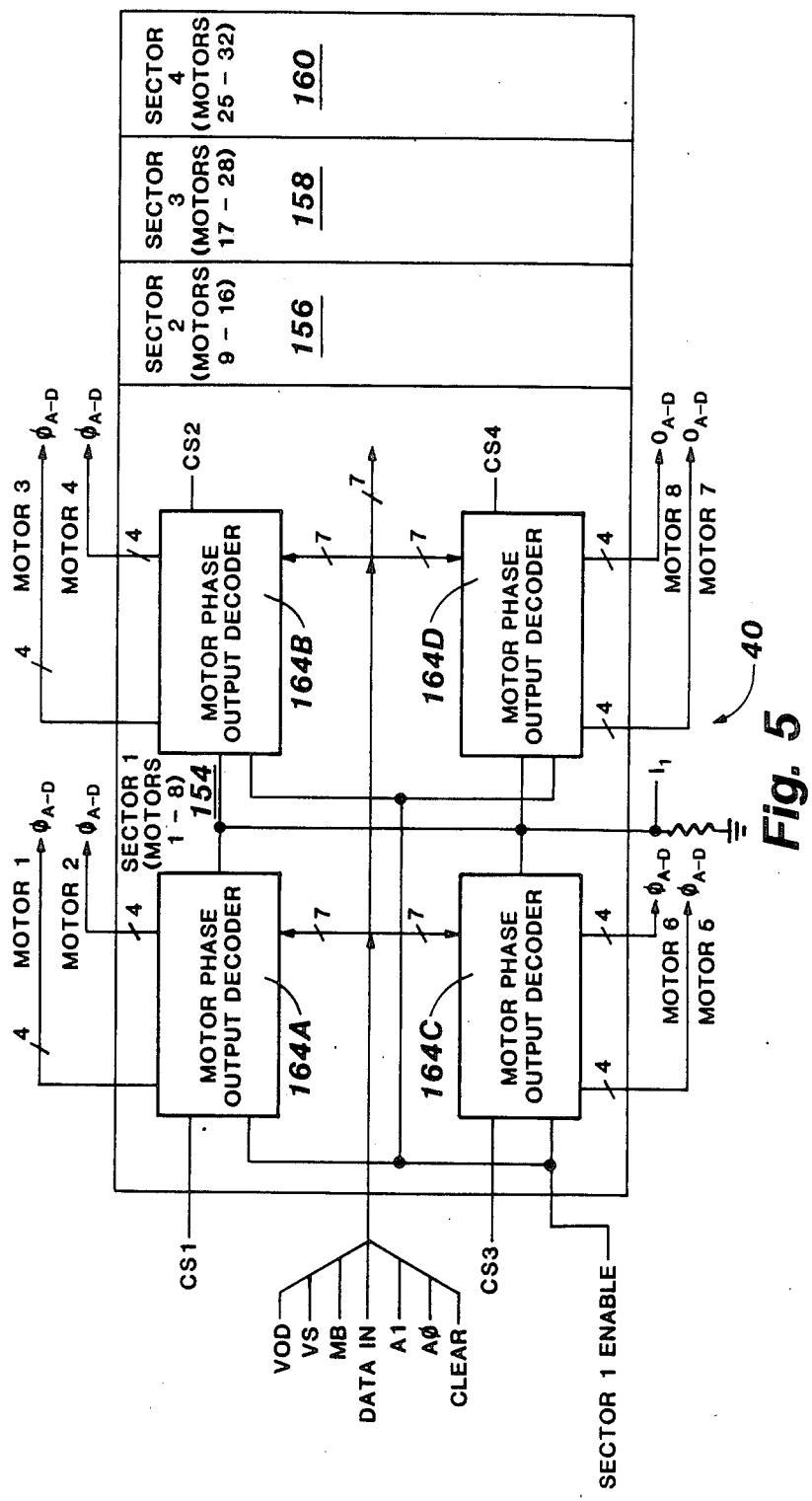
FIG. 5 is a block diagram of motor drivers depicted in FIG. 1.

FIG. 5 is a functional block diagram of motor drivers 40 (FIG. 1). Voltage inputs ($V_{OD}$, $V_S$), a motor bank signal (MB), and phase state data (A∅, A1, DATA IN) are provided to motor phase output decoders, illustrated as decoders 164A-D in Sector 1. The motor driver chip select signal (CS1-16) enables a particular decoder, e.g., CS1, CS2, CS3, or CS4 in Sector 1.

As shown in FIG. 5, motor drivers 40 are grouped into four sector control groups 154, 156, 158, 160 and the sectors are sequentially enabled to provide for the control of 32 motors. As shown, sector 1 is comprised of motor phase output decoder chips 164A-D, which in turn control motors 1 through 8. Four phase output control signals are provided to energize the motor phases, ΦA-D, in a sequence effective to step the motor to a new position.

Figure 6:
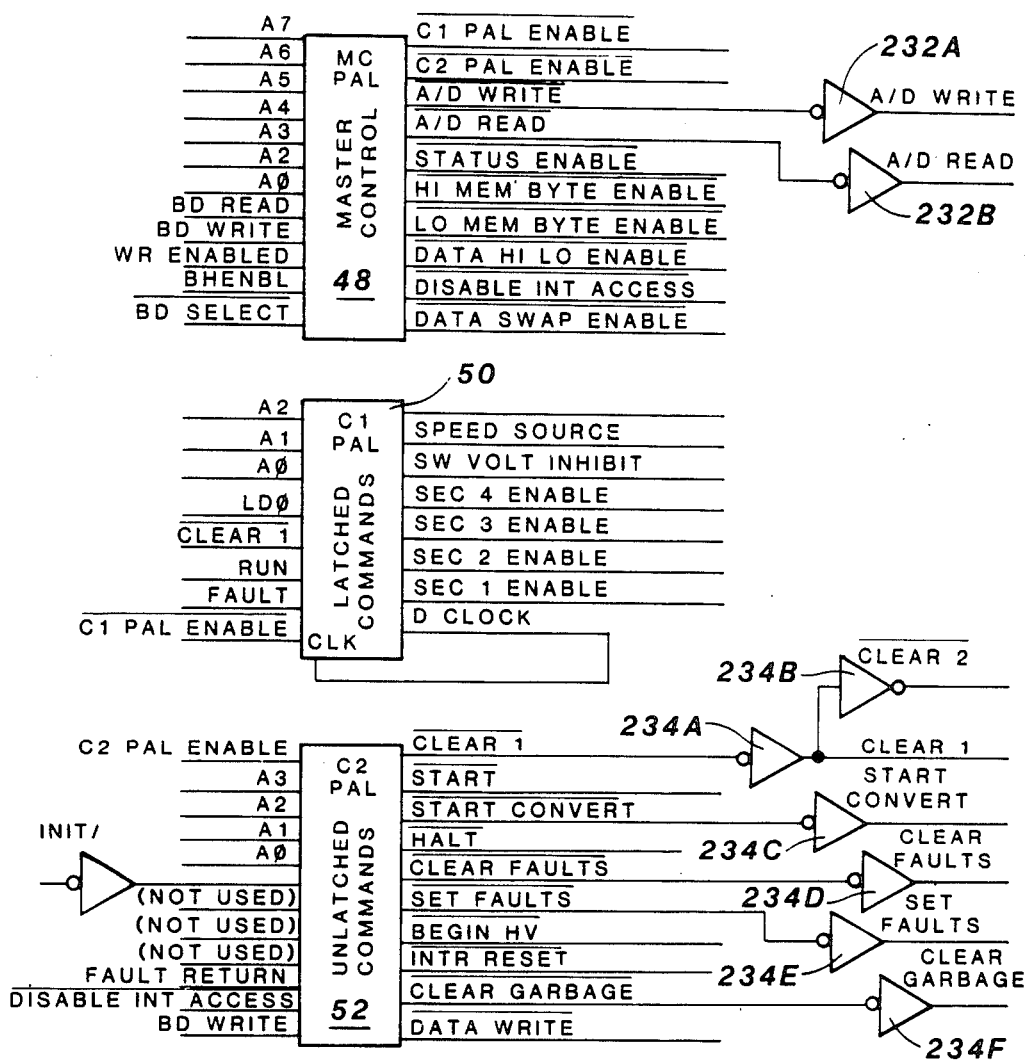
FIG. 6 is a schematic for control and status register circuits shown in FIG. 2.

A detailed schematic of components forming a portion of control line status registers 10 (FIG. 1) is shown in FIG. 6. MC PAL 48, C1 PAL 50, and C2 PAL 52 provide logic circuits relating inputs to outputs as shown in Master Control Table B, Latched Commands Table C, and Unlatched Commands Table D, respectively. The following symbols are used in defining the PAL logic: # = OR; & = AND; ! = invert.

Address data and various system read, write, enable, and fault inputs are provided to PALs 48, 50, 52 which logically combine and output a plurality of enablement signals and various command signals to data bus 18 (FIG. 1). It will be noted that in one embodiment of the invention, inverting amplifiers 238A and 232B invert the analog-to-digital write and read enablements, respectively, for input to support function circuits 14 (FIG. 1). Likewise, inverting amplifiers 234A-F invert various outputs from command PAL 52 for further use in the motor control system.

TABLE B

MASTER CONTROL (MC PAL)

| PIN* | INPUT | PIN* | OUTPUT | OUTPUT LOGIC |
|---|---|---|---|---|
| 1 | A7 | 14 | ! DATA SWAP ENBL | !(! DISABLE INT ACC & Board Select & ! BH ENBL & A0) |
| 2 | A6 | 15 | ! DISABLE INT ACC | !((! WR ENABLED) # (A7 & A6) # (! Board Select)) |
| 3 | A5 | 16 | ! DATA HI LO ENBL | !((! DISABLE INT ACC & Board Select & BH ENBL) # (! DISABLE INT ACC & Board Select & ! A0)) |
| 4 | A4 | 17 | ! LO MEM BYTE ENBL | !((! WR ENABLED) # (WR ENABLED & Board Select & BH ENBL)(WR ENABLED & Board Select & ! BH ENBL & ! A0)) |
| 5 | A3 | 18 | ! HI MEM BYTE ENBL | !((! WR ENABLED) # (WR ENABLED & Board Select & BH ENBL) # (WR ENABLED & Board Select & ! BH ENBL & A0)) |
| 6 | A2 | 19 | ! STATUS ENBL | !(A7 & A6 & A5 & A4 & ! A3 & ! A2 & BD READ) |
| 7 | A0 | 20 | ! A/D READ | !(A7 & A6 & A5 & ! A4 & A3 & ! A2 & BD READ) |
| 8 | BD READ | 21 | ! A/D WRITE | !(A7 & A6 & A5 & ! A4 & ! A3 & ! A2 & BD WRITE) |
| 9 | BD WRITE | 22 | ! C2 ENBL | !(A7 & A6 & ! A5 & A4 & BD WRITE) |
| 10 | WR ENABLED | 23 | ! C1 ENBL | !(A7 & A6 & ! A5 & ! A4 & ! A6 & BD WRITE) |
| 11 | BH ENBL | | | |
| 13 | ! Board Select | | | |

*MMI Model 20L10

TABLE C

LATCHED COMMANDS (C1 PAL)

| PIN* | INPUT | PIN* | OUTPUT | OUTPUT LOGIC |
|---|---|---|---|---|
| 1 | CLK | 12 | D CLK | CLK |

TABLE C-continued

| | | | LATCHED COMMANDS (C1 PAL) | |
|---|---|---|---|---|
| PIN* | INPUT | PIN* | OUTPUT | OUTPUT LOGIC |
| 2 | A2 | 13 | SEC 1 ENBL | !((A2 & ! A1 & ! A0 & ! D0 & ! RUN) # (!(A2 & ! A1 & ! A0) & !SEC 1 ENBL) # (RUN & ! SEC 1 ENBL) # (CLEAR) # (FAULT)) |
| 3 | A1 | 14 | SEC 2 ENBL | !((! A2 & A1 & A0 & ! D0 & ! RUN) # (!(! A2 & A1 & A0 & ! SEC 2 ENBL) # (RUN & ! SEC 2 ENBL) # (CLEAR) # (FAULT)) |
| 4 | A0 | 15 | SEC 3 ENBL | !((! A2 & A1 & ! A0 & ! D0 & ! RUN) # (!(! A2 & A1 & ! A0) & ! SEC 3 ENBL) # (RUN & ! SEC 3 ENBL) # (CLEAR) # (FAULT)) |
| 5 | D0 | 16 | SEC 4 ENBL | !((!A2 & ! A1 & A0 & ! D0 & ! RUN) # (!(! A2 & ! A1 & A0) & ! SEC 4 ENBL) # (RUN & ! SEC 4 ENBL) # (CLEAR) # (FAULT)) |
| 6 | ! CLEAR | 17 | SW VOLT INHIBIT | !((A2 & ! A1 & A0 & ! D0 & ! RUN & ! CLEAR & ! FAULT) # (!(A2 & ! A1 & A0) & ! SW VOLT INH & ! CLEAR & ! FAULT) # (RUN & ! SW VOLT INH & ! CLEAR & ! FAULT)) |
| 7 | RUN | 18 | Speed Source | !((! A2 & ! A1 & ! A0 & ! D0 & ! RUN) # (!(! A2 & ! A1 & ! A0) & ! Speed Source) # (RUN & ! Speed Source) # (CLEAR) # (FAULT)) |
| 8 | FAULT | 19 | !CLK | !((C1 ENBL) # (CLEAR) # (FAULT)) |
| 9 | ! C1 ENBL | | | |

*MMI Model 16R6

TABLE D

| | | | UNLATCHED COMMANDS (C2 PAL) | |
|---|---|---|---|---|
| PIN* | INPUT | PIN* | OUTPUT | OUTPUT LOGIC |
| 1 | ! C2 ENBL | 14 | ! DATA WRITE | !(! DISABLE INT ACC & BD WRITE) |
| 2 | A3 | 15 | ! CLEAR GARBAGE | !(C2 ENBL & ! A3 & ! A2 & ! A1 & ! A0) |
| 3 | A2 | 16 | ! INTR RESET | !(C2 ENBL & ! A3 & ! A2 & ! A1 & A0) |
| 4 | A1 | 17 | ! BEGIN HV | !(C2 ENBL & ! A3 & ! A2 & A1 & ! A0) |
| 5 | A0 | 18 | ! SET FAULT | !(C2 ENBL & ! A3 & ! A2 & A1 & A0) |
| 6 | INIT | 19 | ! CLEAR FAULTS | !(C2 ENBL & ! A3 & A2 & ! A1 & ! A0) |
| 10 | FAULT RETURN | 20 | ! HALT | !(C2 ENBL & ! A3 & A2 & ! A1 & A0) |
| 11 | DISABLE INT ACC | 21 | ! START CONVERT | !(C2 ENBL & ! A3 & A2 & A1 & ! A0) |
| 13 | BD WRITE | 22 | ! START | !(C2 ENBL & ! A3 & A2 & A1 & A0) |
| | | 23 | ! CLEAR | !((C2 ENBL & A3 & ! A2 & ! A1 & ! A0) # (INIT) # (FAULT RETURN)) |

*MMI Model 20L10

Figure 7:
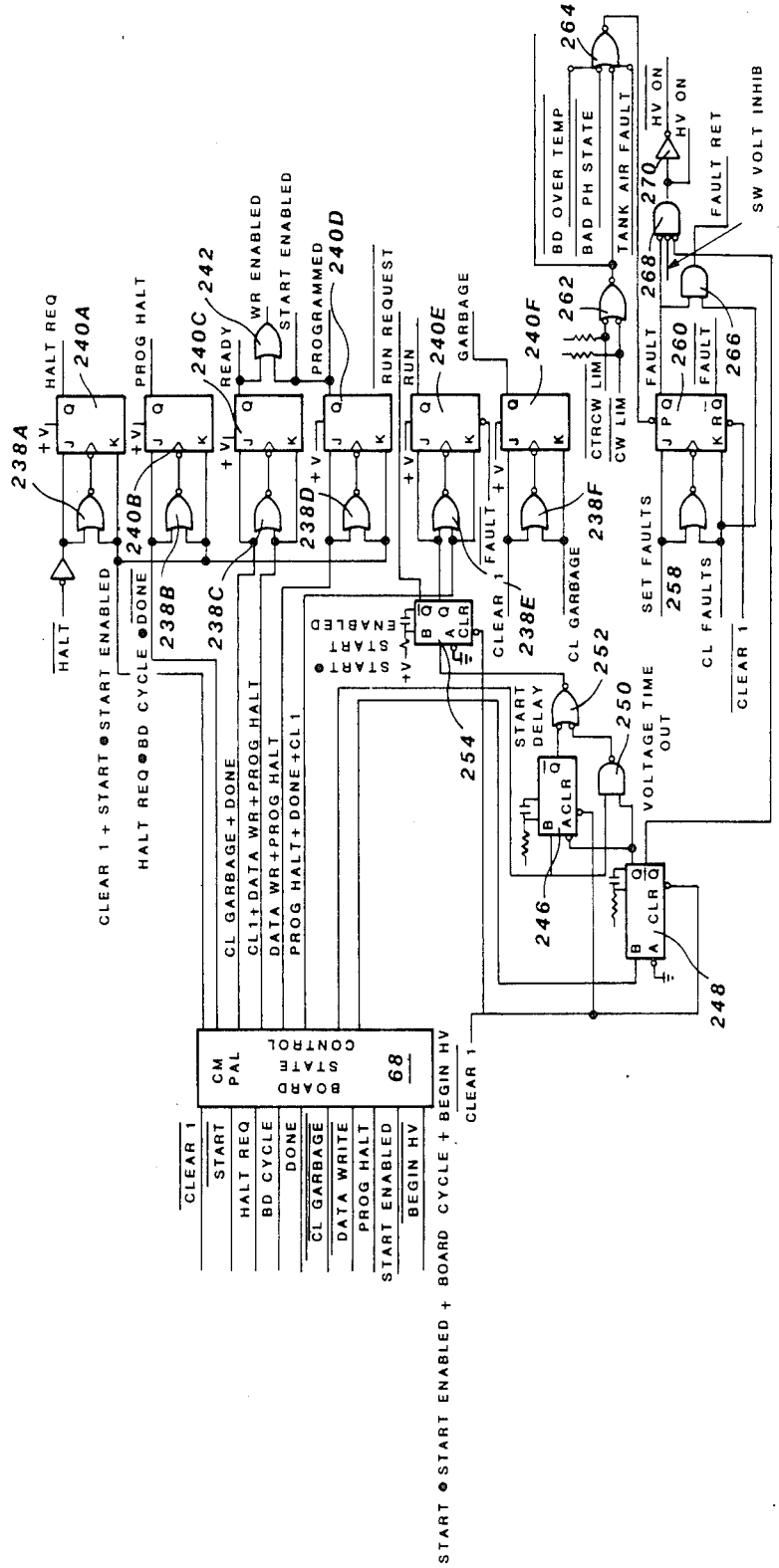
FIG. 7 is a schematic for board state control circuits depicted in FIG. 2.

Referring now to FIG. 7, there is shown a schematic of one embodiment of board state control PAL 68 and latches 70 (FIG. 2). The state control is basically provided by CM PAL 68 which logically combines inputs as shown in FIG. 7 to derive output signals representing the operational status of the system. The outputs from PAL 68 are presented to NOR gates 238A, B, C, D, E, F for presentation to J-K flip-flops 240A, B, C, D, E, F, where the output from a NOR gate toggles the associated flip-flop to place an output on the Q line from the flip-flop. OR gate 242 further combines outputs from flip-flops 240C and 240D to provide a Write Enabled output.

The outputs from CM PAL 68 are also provided to timing circuits for use in system operation. Delay timing one-shot flip-flop 248 provides timing for the high voltage (HV) signals where the high voltage supply is terminated after an interval with no control activity. Start delay one-shot flip-flop 246, NAND gate 250, and NOR gate 252 provide a delayed output to one-shot flip-flop 254 to provide time for the system to place itself in a start condition prior to beginning a control run.

The high voltage control signals are derived through NOR gate 262 and NOR gate 264 to provide a first preset to J-K flip-flop 260 as a fault condition indicator. SET fault and CLEAR fault signals are also provided to flip-flop 260 and derive a clocking output through NOR gate 258 to derive a FAULT signal for input to AND gate 268 along with a voltage timeout signal from flip-flop 248. A High Voltage ON output is obtained from AND gate 268 and a High Voltage OFF (HV ON) output is obtained through inverting amplifier 270 to turn off the high voltage. Thus, motor voltages are terminated when motor movement is completed or where a fault condition exists in the system.

Figure 8:
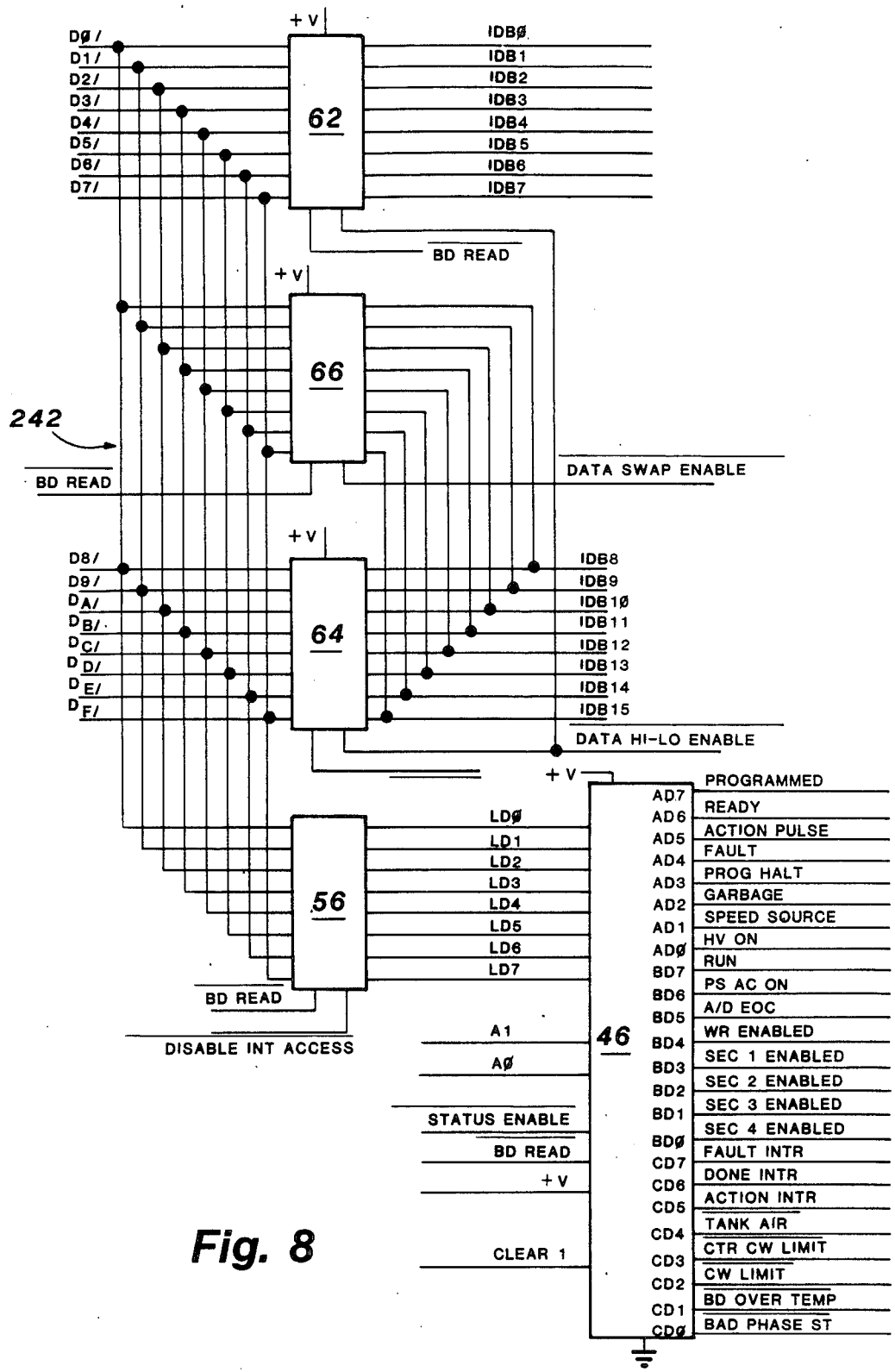
FIG. 8 is a schematic for multibus interface circuits depicted in FIG. 2.
Figure 9:
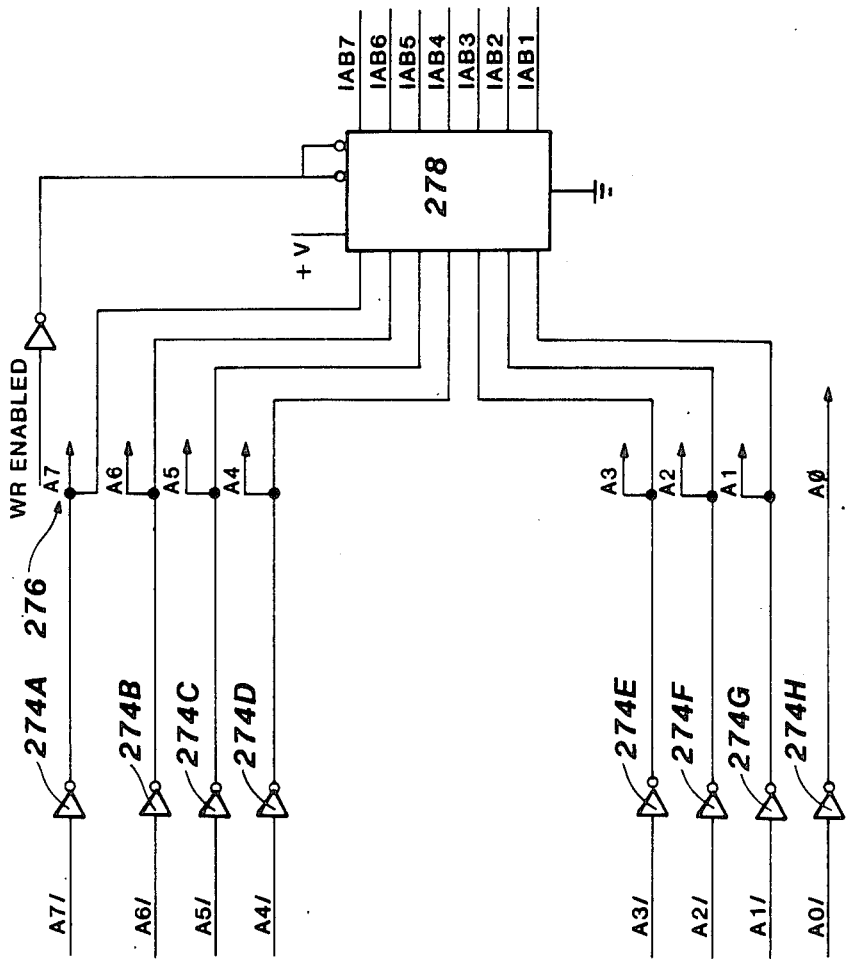
FIG. 9 is a schematic for address buffer circuits depicted in FIG. 2.

Referring now to FIG. 8, there is shown a schematic of components forming a portion of multibus interface circuits 12 (FIG. 1). Status register 46 in control and status board 10 (FIG. 1) obtains a plurality of inputs, shown in FIG. 8, from the outputs of PALs 48, 50, 52 (FIG. 6) and provides an output on data bus 18 (FIG. 1), to data buffer 56. Data buffer 56 thereafter outputs data lines 60 (FIG. 2) to multibus 24 data lines (D0-D9-/D$_A$-D$_F$). Data buffers 62 and 64 accept data from multibus interface 24 and transmit the data to internal data bus lines (IDB0-15). Data swap buffer 66 may be enabled to permit either 8-bit or 16-bit data to be handled.

It will be noted in FIG. 2 that the multibus 12 interface function includes circuitry 79 for developing an address code (ADDECODE). Schematically this circuit is parallel address lines with associated parallel inverting amplifiers which may be jumper connected to outputs in a preselected manner. These jumper outputs are provided to a NAND gate which simply provides an address output when the preselected address signals are present to enable one particular motor control circuit board.

Figure 10:
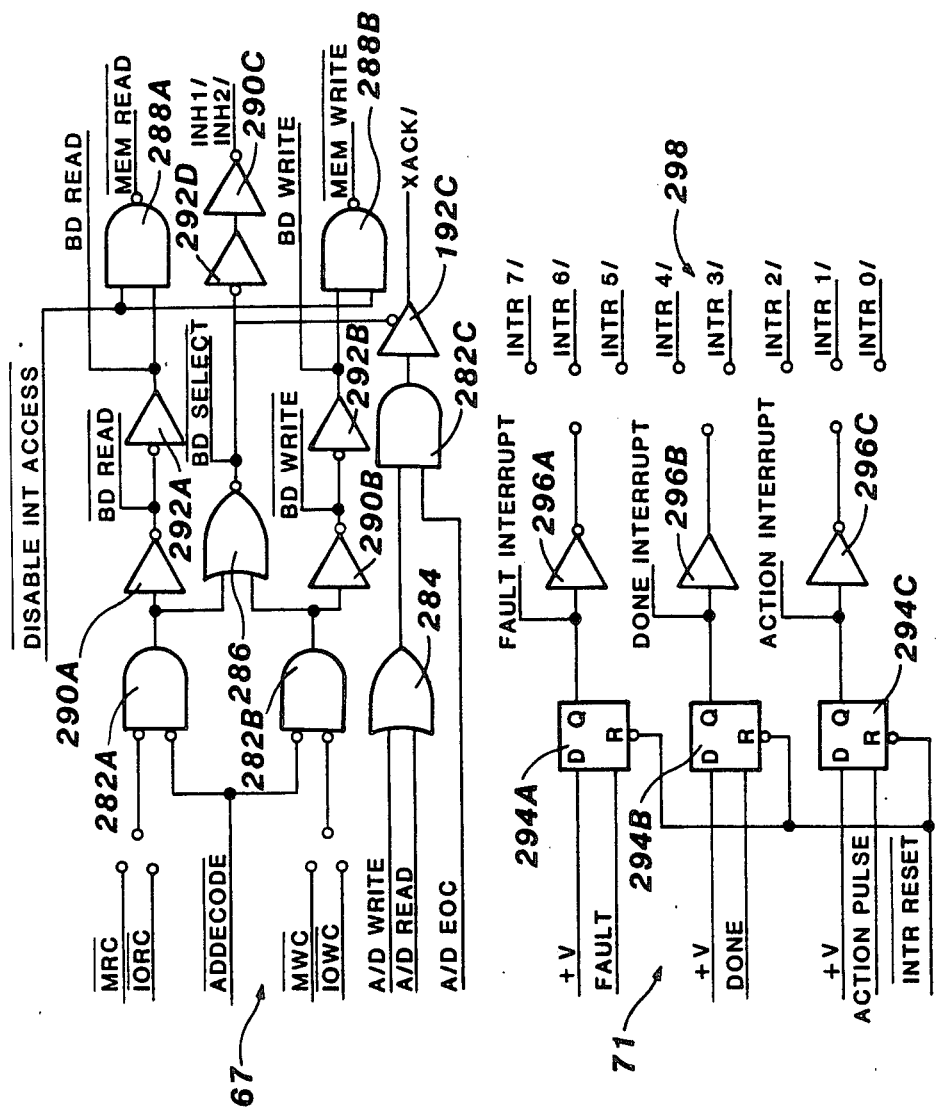
FIG. 10 is a schematic for combinational logic circuits depicted in FIG. 2.

The remaining portions of multibus interface 12 function are shown in FIG. 10. Combinational logic 67 (FIG. 2) is formed from a plurality of logic elements. A data source may be selected from a computer (MRC, MWC) or from an IN/OUT port (IORC, IOWC). Conversion status information is provided from the analog-to-digital converter 84 (FIG. 2). AND gates 282A, B process the memory/in-out data and OR gate 284 handles the analog-to-digital data. Data processing is provided through NOR gate 286 with inverting amplifiers 298B and 292A, B. Additional status input, as shown in FIG. 10, is processed through AND gates 288A, B. The output from NOR gate 286 is further processed through amplifier 292D and inverting amplifier 290C to form the final output enabling signals as shown.

Interrupt latches 71 comprise flip-flops 294A, B, C with parallel outputs and inverted outputs through inverting amplifiers 296A, B, C. The outputs and inverted outputs may be connected with jumpers 298 in a preselected manner to provide interrupt signals to multibus 24.

Figure 11:
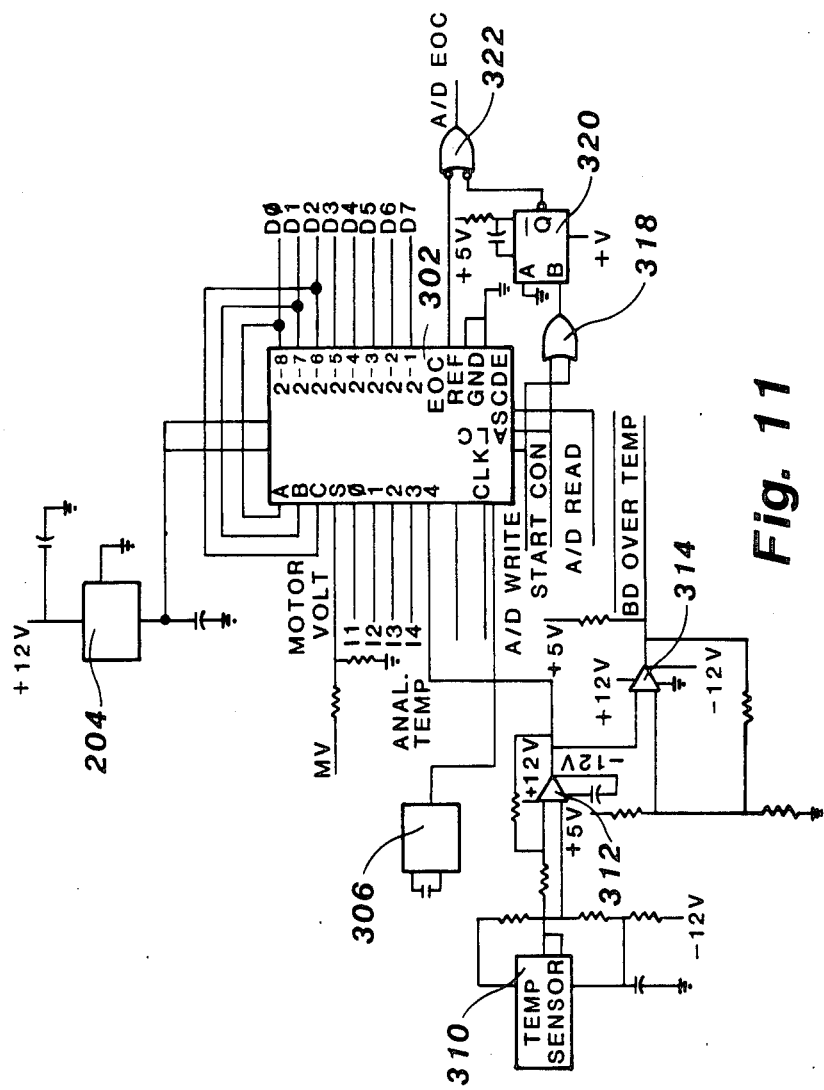
FIG. 11 is a schematic for support function generator circuits depicted in FIG. 2.

Support function circuitry 14 (FIGS. 1, 2) is shown schematically in FIG. 11. Analog-to-digital converter 302 receives temperature, current, and voltage inputs in analog form for conversion to digital data. Temperature sensor 310 detects the circuit board temperature which is amplified by amplifier 312 for presentation to converter 302 and to comparator 314. Reference voltage source 304 and voltage controlled oscillator 306 are provided for the conversion process. Comparator 314 directly provides a status output of an over-temperature condition on the circuit board (BD OVER TEMP).

Status information on the conversion process (signals A/D WRITE, START CON, A/D READ) are provided to converter 302 for enabling analog data input, the conversion process, and digital data output. The status signals are also provided through OR gate 318 to latch 320 and then to OR gate 322. The output of OR gate 322 is a status signal that the analog-to-digital conversion process is complete, enabling the system to accept the digital data.

Figure 12:
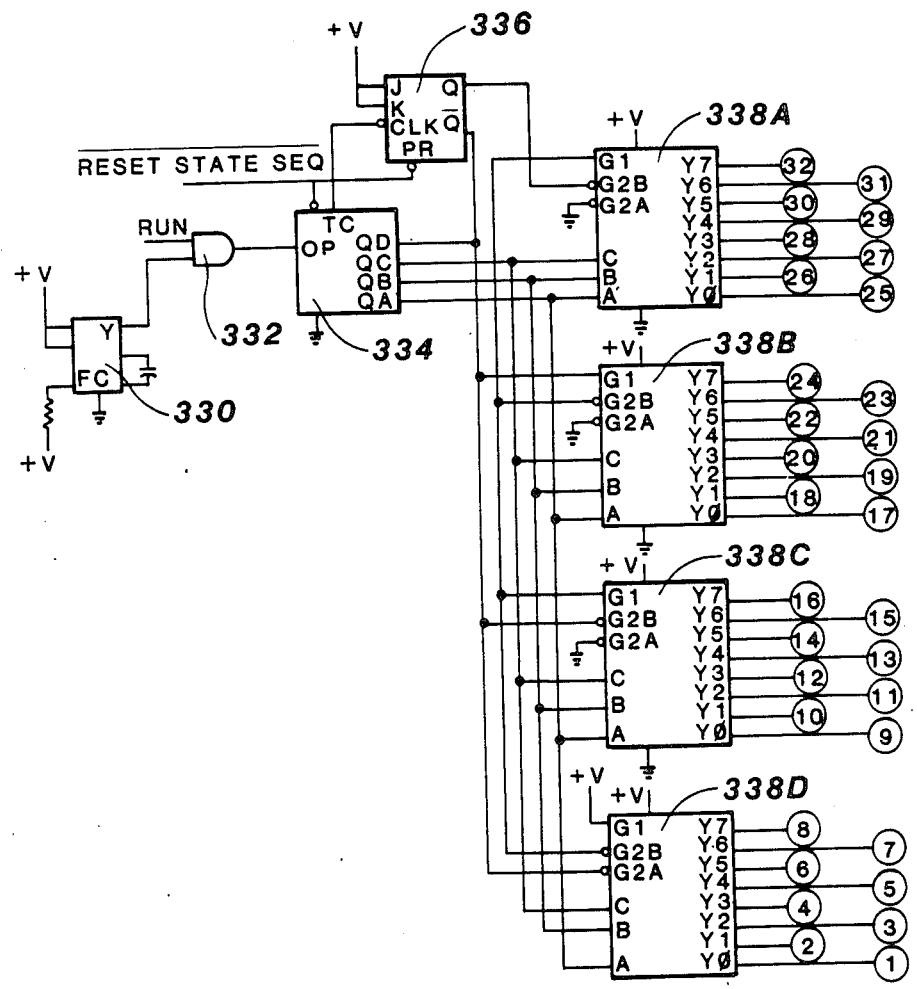
FIG. 12 is a schematic for state sequencer circuits depicted in FIG. 2.

State Sequencer 34 (FIG. 2) is schematically shown in FIG. 12. A sequential Address Generator 334 is clocked from clock 330 through AND gate 332 in conjunction with a RUN signal. Flip-flop 336 and Address Generator 334 provide inputs to State Decoders 338A, B, C, D, which thereafter provide a sequence of 32 output signals to sequentially enable an operational routine for system components as shown in FIGS. 13-16. The routine of operational events triggered by State Sequencer 34 is the following:

| STATE SEQUENCE ROUTINE | |
|---|---|
| READ A | |
| State 1 | 1. Select memory A [−]. |
| State 2 | 2. Enable outputs-memory read [−]. |
| State 3 | 1. Latch counter registers [+]. |
| | 2. Latch all zeros [+]. |
| | 3. Latch up/down [+]. |
| | 4. Latch direction [+]. |
| READ C | |
| State 4 | 1. Select memory C [−]. |
| State 5 | 1. Load step advance counters [−+]. |
| State 6 | 1. Latch upper and lower speed [+]. |
| | 2. Latch last phase state [+]. |
| READ B | |
| State 7 | 1. Select memory B. |
| State 8 | 1. Latch skip count [+]. |
| | 2. Latch ramp level [+]. |
| | 3. Latch enable PROM [+]. |
| State 9 | |
| State 10 | 1. Board cycle clock [+]. |
| | 2. Enable skip count in [−]. |
| | 3. Disable memory outputs [−]. |
| WRITE ENABLE B | |
| State 11 | 1. Latch skip count register [+]. |
| State 12 | 1. Preset action latch [−]. |
| State 13 | 1. Clock chip select sequencer [−]. |
| | 2. Load skip counter [−]. |
| State 14 | 1. Disable skip count input [−]. |

| -continued | |
|---|---|
| STATE SEQUENCE ROUTINE | |
| | 2. Clock skip counter [−]. |
| State 15 | 1. Ramp level PAL clock 1 [−]. |
| | 2. Next phase state PAL clock [−]. |
| State 16 | 1. Motor bank enable latch [+]. |
| State 17 | 1. Enable ramp level and skip count onto bus [−]. |
| | 2. Ramp level PAL clock 2 [−]. |
| | 3. Next phase state PAL clock [−]. |
| State 18 | 1. Write memory B [−]. |
| | 2. Latch chip select sequencer clock enable [+]. |
| WRITE ENABLE C | |
| State 19 | 1. Remove ramp level and skip count from bus [−]. |
| | 2. Select memory C [−]. |
| State 20 | |
| State 21 | 1. Clock action latch [+]. |
| | 2. Latch bad phase state [−]. |
| State 22 | |
| State 23 | 1. Clock step advance counters [−]. |
| State 24 | 1. Enable last phase state and speed from bus [−]. |
| State 25 | 1. Write memory C [−]. |
| WRITE ENABLE A | |
| State 26 | 1. Remove last phase state and speeds from bus [−]. |
| | 2. Select memory A [−]. |
| State 27 | |
| State 28 | 1. Enable step count and direction onto bus [−]. |
| State 29 | 1. Write memory A[−]. |
| State 30 | 1. Remove step count and direction from bus [−]. |
| State 31 | 1. Clock address sequencer [−]. |
| State 32 | |

In several of the state conditions, a plurality of elements are enabled for data processing to pipeline data through the logic circuits. Either the leading [+] or the trailing [−] edge of the clock pulses may trigger a sequence event. It will be apparent from the State Sequence Routine that motor data is read onto the data buses along with various counter totals and loaded into various system components. The loaded data is logically processed to a second data set which is further logically processed to determine if the selected motor should move and the direction and phase information for a movement. The counter totals are updated and the derived third data set is placed back in memory for use during the next motor address sequence. Thus, existing data is processed directly to produce movement of a motor, the data is updated in parallel with this processing, and the updated data is returned to the memory system. There are no data processing loops which must be satisfied and the data moves directly, or pipelines, through the logical processing networks.

Figure 13:
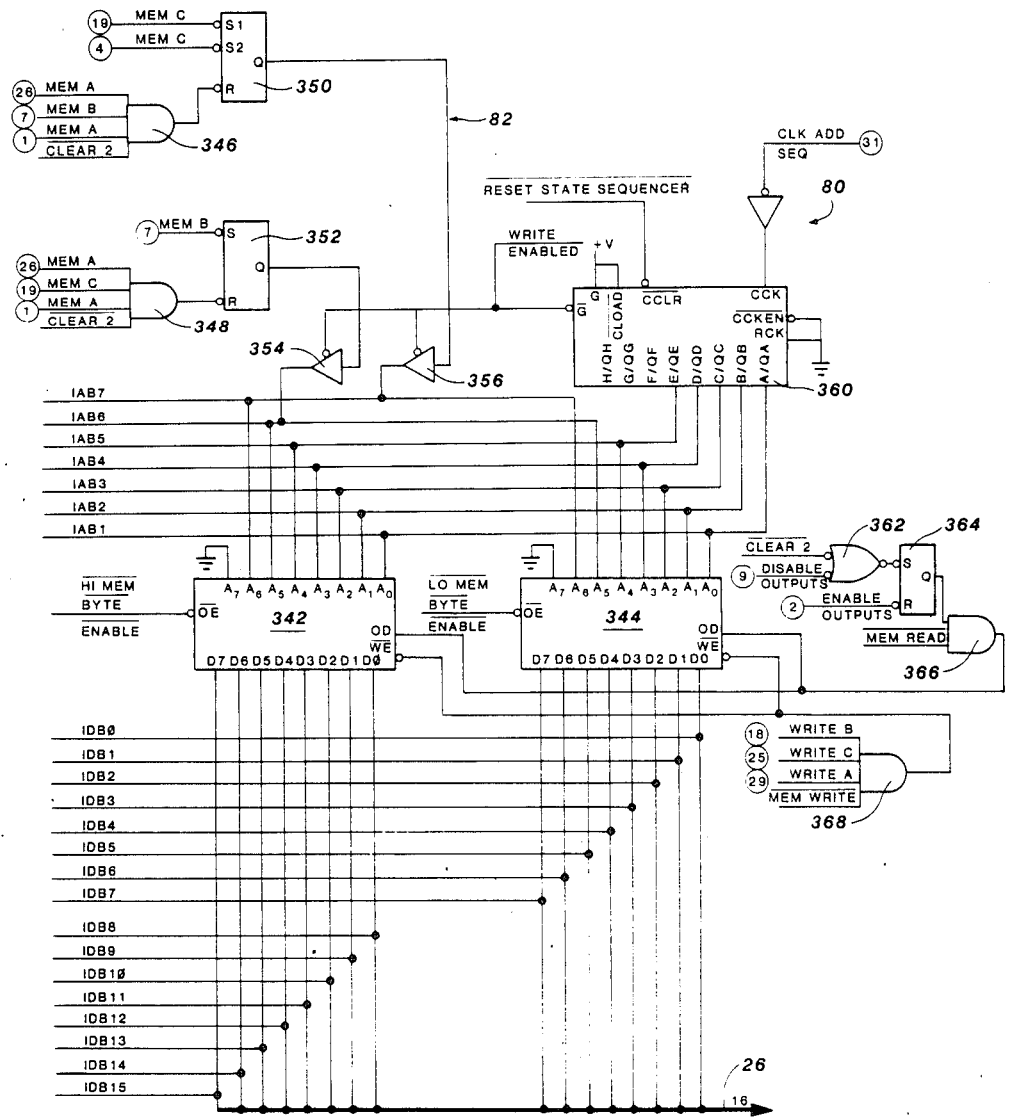
FIG. 13 is a schematic for data storage circuits depicted in FIG. 2.
Figure 14:
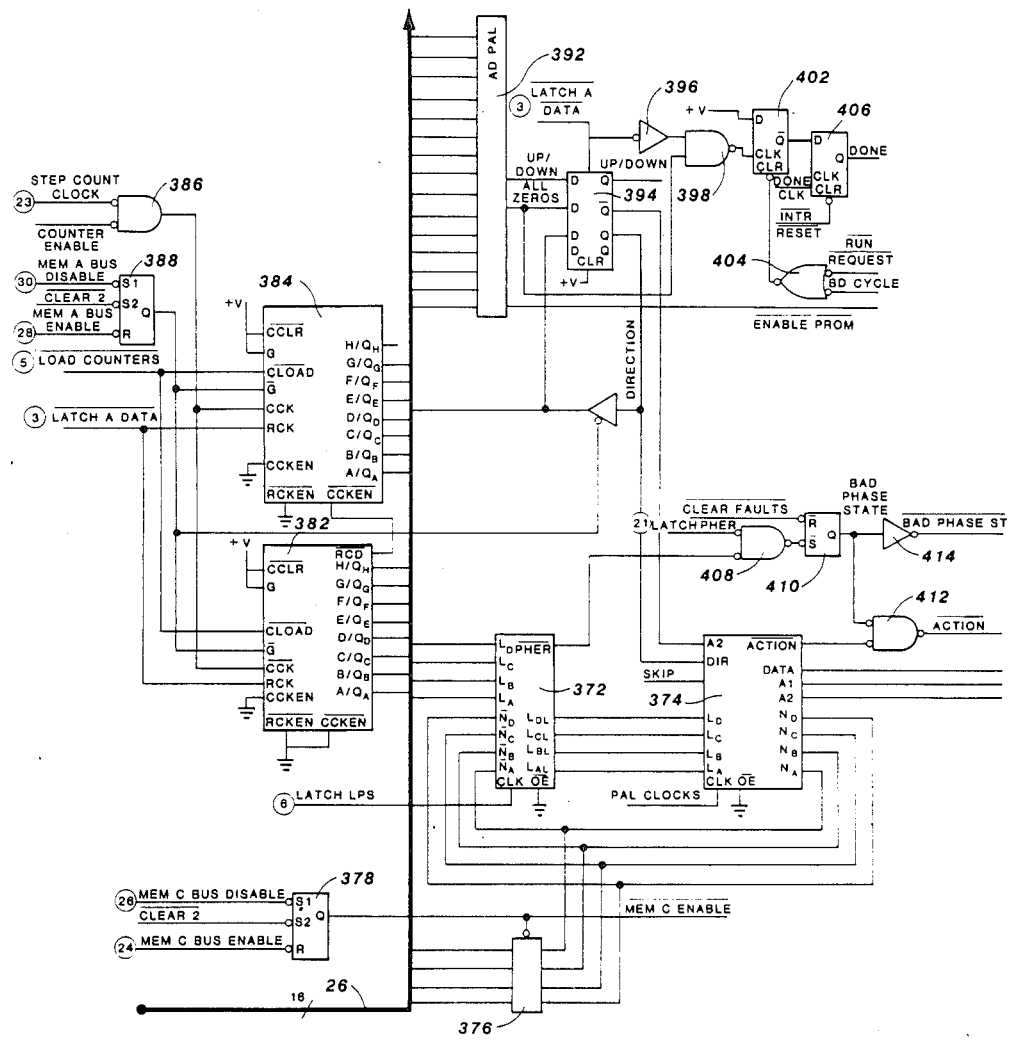
FIG. 14 is a schematic for motor data development circuits depicted in FIG. 2.

Referring now to FIG. 13, there is shown a schematic of data storage circuits 20 (FIGS. 1, 2). RAM storage is provided in memory units 342, 344. Portions of the RAM memories are selectively enabled by State Sequencer 34 (FIGS. 1, 3, 12). LO MEM BYTE 344 accepts data from data lines IDB∅-7. HI MEM BYTE 342 accepts data from data lines IDB8-15. Specific memory locations are addressed on address lines IAB-1-7.

State sequencers 34 specifically enable one memory data section A, B, C at a time through AND gates 346, 348 and flip-flops 350, 352 through amplifiers 354, 356 onto selected address lines. Thus, the memory sections are enabled in the sequence depicted in the State Sequence Routine, hereinabove set out.

Motor Address Sequencer 360 provides a clocking address sequence for specific motor data stored in RAMs 342 and 344. Each motor data section has memory groups A, B, C containing the data noted in Table E, Memory Layout.

TABLE E
MEMORY LAYOUT

Memory Section C
[(D12-D15): UNUSED] [(D8-D11): LAST PHASE STATE] [(D3-D7): UPPER SPEED] [(D0-D2): LOWER SPEED]
Memory Section B
[(D14-D15): UNUSED] [(D8-D13): RAMP LEVEL] [(D0-D7): SKIP COUNT]
Memory Section A
[(D15): DIRECTION] [(D0-D14): STEP COUNT IN 2'S COMPLEMENT]

The memory locations for the addressed motor are enabled and the enabled memory sections read data on data bus 26 upon an enabling output logically derived through NOR gate 362, flip-flop 364, and AND gate 366 from enabling signals generated by State Sequencer 34. Data from the enabled memory sections are written to data bus 26 when enabled by State Sequencer 34 signals processed through AND gate 368.

Motor data development circuits 28 (FIG. 1) process the data in RAM memories 342, 344 to derive new phase state information from the present status data for an addressed motor. Phase information is processed through PAL 372 and PAL 374. Phase Error PAL 372 logically processes input data from Data Storage 20 (FIG. 1) for input to Next Phase PAL 374, which determines the next phase data for moving the selected motor. A SKIP input is also provided to PAL 374 for enabling an output if a movement is to actually occur.

The next phase data is latched into next phase latch 376 and further returned to PAL 372. PAL 372 logically determines from the present phase state data from memory and the next phase state data from PAL 374 if a phase error exists. Table F is the output logic for Phase Error PAL 372. Table G is the output logic for Next Phase PAL 374.

If the present phase state and the next phase state are not logically compatible then an error condition exists. A flag is output for processing through NAND gate 408, flip-flop 410, NAND gate 412, and inverting amplifier 414 to provide a Bad Phase State status signal and a NO ACTION signal, where necessary. Flip-flop 378 enables the contents of latch 376 to be read back into memory as enabled by the state signals from State Sequencer 34.

The phase state circuitry also counts step data relative to the number of steps taken by the motor toward the final destination. Counters 382 and 384 communicate with memory section A, which contains step count data. A present step count is loaded into counters 382, 384 and is updated during each address cycle of the motor by State Sequencer 34. State address lines are provided to AND gate 386 and flip-flop 388 for input to counters 382 and 384.

TABLE F

PHASE ERROR (PE PAL)

| PIN* | INPUT | PIN* | OUTPUT | OUTPUT LOGIC |
|---|---|---|---|---|
| 1 | CLK | | | |
| 2 | LAST (Motor $0_D$) 1d | 12 | ! Phase 1 | !((nd & nb) # (nc & na) # (1d1 & 1c1 & ! nd & ! nc) # (1c1 & 1b1 & ! nc & ! nb) # (1b1 & 1a1 & ! nb & ! na) # (1d1 & 1a1 & ! nd & ! na)) |
| 3 | LAST (Motor $0_C$) 1c | 13 | ! Phase 2 | !((1a1 & nc) # (!1d1 & ! 1b1 & 1a1 & ! na) # (1a1 & ! nd & ! nb & ! na) # (1b1 & nd) # (! 1c1 & 1b1 & ! 1a1 & ! nb) # (1b1 & ! nc & ! nb & ! na)) |
| 4 | LAST (Motor $0_B$) 1b | 14 | LAST (Motor $0_A$), Latched 1a1 | 1a |
| 5 | LAST (Motor $0_A$) 1a | 15 | LAST (Motor $0_B$), Latched 1b1 | 1b |
| 6 | !NEXT (Motor $0_D$) ! nd | 16 | LAST (Motor $0_C$), Latched 1c1 | 1c |
| 7 | ! NEXT (Motor $0_C$) ! nc | 17 | LAST (Motor $0_D$), Latched 1d1 | 1d |
| 8 | ! NEXT (Motor $0_B$) ! nb | 18 | !Phase 3 | ! ((1c1 & ! nd) # ! 1d1 & 1c1 & ! 1b1 & ! nd) # (1c1 & ! nd & ! nc & ! nb) # (! nd & ! nc & ! nb & ! na) # (1d1 & nb) # (1d1 & ! 1c1 & ! 1a1 & ! nd) # (1d1 & ! nd & ! nc & ! na)) |
| 9 | ! NEXT (Motor $0_A$) ! na | 19 | !PHER | !((Phase 3) # (Phase 2) # (Phase 1) # (1d1 & 1b1) # (1c1 & 1a1) # (! 1d1 & ! 1c1 & ! 1b1 & ! 1a1)) |

*MMI Model 16R4

TABLE G

NEXT PHASE STATE (NPAL)

| PIN* | INPUT | PIN* | OUTPUT | OUTPUT LOGIC |
|---|---|---|---|---|
| 1 | CLK | 12 | ! New $0_A$ ! na | !((az & ia) # (SKIP & ia) # (! az & ! SKIP & DIRECTION & ia & ! ib) # (! az & ! SKIP & DIRECTION & id & ! ic) # (! az & ! SKIP & ! DIRECTION & ia & ! id) # (! az & ! SKIP & ! DIRECTION & ib & ! ic)) |
| 2 | ALL ZEROS (az) | 13 | ! New $0_b$ ! nb | !((az & ib) # (SKIP & ib) # (! az & ! SKIP & DIRECTION & ib & ! ic) # (! az & ! SKIP & ! DIRECTION & ia & ! id) # (! az & ! SKIP & 49 DIRECTION & ib & ! ia) # (! az & ! SKIP & ! |

TABLE G-continued

| | | NEXT PHASE STATE (NPAL) | | |
|---|---|---|---|---|
| PIN* | INPUT | PIN* | OUTPUT | OUTPUT LOGIC |
| 3 | SKIP | 14 | ! New $0_C$ ! nc | !((az & ic) # (SKIP & ic) # (! az & ! SKIP & DIRECTION & ic & ! id) # (! az & ! SKIP & DIRECTION & ib & ! ia) # (! az & ! SKIP & ! DIRECTION & ic & ! ib) # (! az & ! SKIP & ! DIRECTION & id & ! ia )) DIRECTION & ic & ! id)) |
| 5 | DIRECTION | 15 | ! New $0_D$ ! nd | !((az & id) # (SKIP & id) # (! az & ! SKIP & DIRECTION & id & ! ia) # (! az & ! SKIP & DIRECTION & ic & ! ib) # (! az & ! SKIP & ! DIRECTION & id & ! ic) # (! az & ! SKIP & ! DIRECTION & ia & ! ib)) |
| 6 | PRESENT $0_D$ id | 16 | ADD 2 | !((ia & na) # (! ia & ! na) # (ib & nb) # (! ib & ! nb)) |
| 7 | PRESENT $0_C$ ic | 17 | ADD 1 | !((ia & na) # (! ia & ! nb) # (ic & nc) # (! ic & ! nc)) |
| 8 | PRESENT $0_B$ ib | 18 | DATA | !((ia & na) # (ib & nb) # (ic & nc) # (id & nd)) |
| 9 | PRESENT $0_A$ ia | 19 | ! ACTION | !((ia & na) # (! ia & ! na) # (ib & nb) # (! ib & ! nb) # (ic & nc) # (! ic & ! nc) # (id & nd) # (! id & ! nd)) |

*MMI Model 16R8

Counters 382 and 384, thus, receive step count data from data bus 26, update the step count data, latch the updated data for return to RAM memories 342 and 344, and enable the data to be returned.

AD PAL 392 monitors data bus 26 and logically decodes the data, as shown in Table H. PAL 392 determines whether the motor is accelerating or decelerating. Motor acceleration is programmed to occur within a predetermined number of steps from a motor start condition, preferably 256 steps. Likewise, deceleration is predetermined to begin within a preselected number of steps of reaching the motor destination, again preferably 256 steps. Count data within counters 382, 384 enable this determination to be made.

AD PAL 392 further monitors all counter data during the state sequence routines. When the counter data is zero for all motors at the completion of a board cycle, an output is obtained to indicate that the board action is complete. Thus, where flip-flop 402 is cleared by a Board Cycle Request through NOR gate 404, memory section A data is latched per amplifier 396 output, and ALL ZERO signal is present, NAND gate 398 clocks flip-flop 402 to provide an input to flip-flop 406 to derive a DONE output, indicative of movement completion, on a clocking signal.

Figure 15:
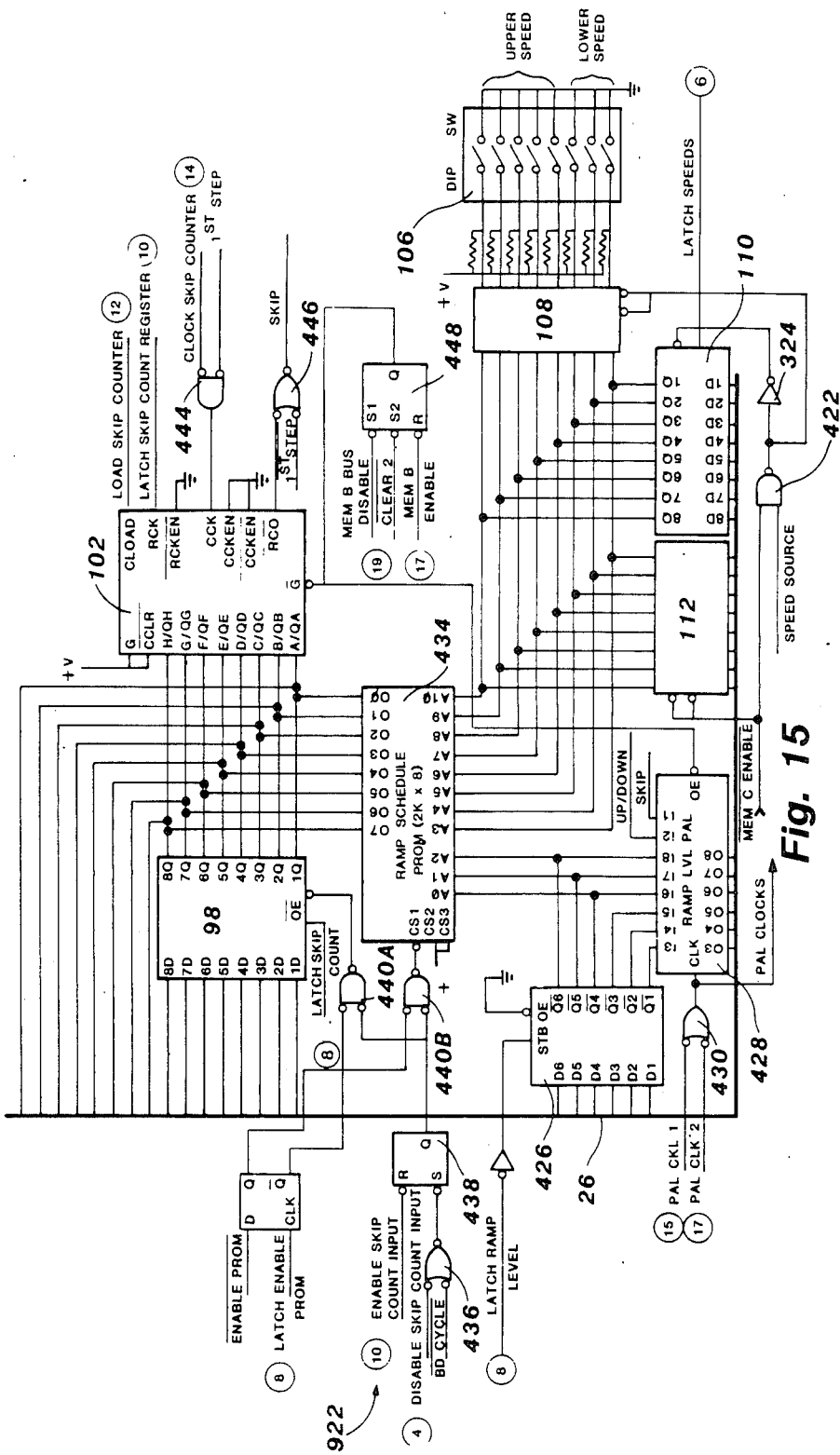
FIG. 15 is a schematic for ramp level generator circuits depicted in FIG. 2.

One of the unique aspects of the present apparatus is the ramping circuitry. One embodiment of a ramping circuit is depicted in FIG. 15. Conventional step motor systems generally began moving the step motor at a preselected rate and the instantaneous acceleration forces can severely stress motor components. The present apparatus provides for reducing the acceleration forces by accelerating and decelerating the step motor according to a predetermined schedule.

As herein described, eight speed levels, herein ramp levels, are provided. Each step motor can be provided with an independent minimum initial stepping speed and a final operating maximum stepping speed. Ramp schedule PROM 434 will then begin motor stepping at the minimum speed and progressively increase the operating speed until the maximum operating speed is obtained. At each step level PROM 434 outputs a programmed speed as a percentage of the maximum speed permitted by input maximum speed data. Ramp Level PAL 428 outputs a ramp level number from one to eight for input to ramp schedule PROM 434. The logic output for Ramp Level PAL 428 is set out in Table I.

A ramp level is maintained for a predetermined number of steps and after a motor has taken the predetermined number of steps the ramp level number is incremented. Ramp level latch 426 receives data from data bus 26 and latches the data upon receipt of a latch ramp level state signal. The received data have one data portion with the ramp level number stored in memory and another portion with the number of steps taken at the stored ramp level number. The data are latched in latch 426 with the ramp level number portion provided to both PROM 434 and PAL 428. The step count data are provided to ramp level PAL 428. When a PAL clock signal is provided through OR gate 430, PAL 428 logically combines the ramp status data with flags indicating an accelerating or decelerating condition (UP/DOWN) and a SKIP flag indicating whether an actual motor step was taken. The step count is incremented when an actual motor step has been taken. When a motor is accelerating, the UP/DOWN flag increments the ramp level number and, when decelerating, decrements the ramp level number after a predetermined number of steps has been taken.

TABLE H

| | | DATA LINE DECODE (AD PAL) | | |
|---|---|---|---|---|
| PIN* | INPUT | PIN* | OUTPUT | OUTPUT LOGIC |
| 1-11 | D01-D10 | 18 | ! ENABLE PROM | !(! D00 & ! D01 & ! D02 & ! D03 & ! D04 & ! D05 & ! D06 & ! D07) |
| 13-16 | D11-D14 | 19 | !ALL ZEROS | !(! D00 & ! D01 & ! D02 & ! D03 & D04 & ! D05 & ! D06 & ! D07 & ! D08 & ! D09 & ! D10 & ! D11 & ! D12 & ! D13 & ! D14) |
| | | 20 | UP/DOWN | !(D08 & D09 & D10 & D11 & D12 & D13 & D14) |

*MMI MODEL 18L4

TABLE I

| | | | | RAMP LEVEL (R PAL) |
|---|---|---|---|---|
| PIN* | INPUT | PIN* | OUTPUT | OUTPUT LOGIC |
| 1 | CLK | 12 | ! RO3 | !((! INC & RI3) # (INH & RI3) # (INC & ! INH & UP/DOWN & RI3) # (INC & ! INH & UP/DOWN & ! RI3 & RI2 & RI1) # (INC & ! INH & ! UP/DOWN & RI3 & RI2) # (INC & ! INH & ! UP/DOWN & RI3 & RI1)) |
| 2 | SKIP | 13 | ! RO2 | !((! INC & RI2) # (INH & RI2) # (INC & ! INH & UP/DOWN & ! RI2 & RI1) # (INC & ! INH & UP/DOWN & RI2 & ! RI1) # (INC & ! INH & ! UP/DOWN & RI2 & RI1) # (INC & ! INH & ! UP/DOWN & RI3 & ! RI2 & ! RI1)) |
| 3 | UP/DOWN | 14 | ! RO1 | !((! INC & RI1) # (INH & RI1) # (INC & ! INH & ! RI1)) |
| 4 | PI1 | 15 | ! PO3 | !((SKIP & PI3) # (! SKIP & ! PI3 & PI2 & PI1) # (! SKIP & PI3 & ! PI2 & ! PI1) # (! SKIP & PI3 & ! PI2 & PI1) # (! SKIP & PI3 & PI2 & ! PI1)) |
| 5 | PI2 | 16 | ! PO2 | !((SKIP & PI2) # (! SKIP & PI2 & ! PI1) # (! SKIP & ! PI2 & PI1)) |
| 6 | PI3 | 17 | ! PO1 | !((SKIP & PI1) # (! SKIP & ! PI1)) |
| 7 | RI1 | 18 | ! INH | !((RI1 & RI2 & RI3 & SKIP) # (! RI1 & ! RI2 & ! RI3 & ! SKIP)) |
| 8 | RI2 | 19 | ! INC | !(PI3 & PI2 & PI1 & ! SKIP) |
| 9 | RI3 | | | |

PI1, 2, 3: Prescale count; least, second, most significant digits; present
PO1, 2, 3: Incremented PI1, 2, 3
RI1, 2, 3: Ramp level count, binary; present
RO1, 2, 3: Incremented RI1, 2, 3
INC: Increment ramp
INH: Inhibit ramp change
*MMI Model 16R8

Speed data may be input from a variety of sources. As shown in FIG. 15, switches 106 are provided for setting a lower speed or an upper speed through buffer 108. The speed input source is selected through NAND gate 422 and inverting amplifier 324 to enable a source from switches 106 or from RAM memories 342 and 344 (FIG. 13). Speed data from RAM memories 342 and 344 may be input through latch 110 to Ramp Schedule PROM 434. Thereafter, buffer 112 serves to transfer data from data bus 26 to ramp schedule PROM 434.

Thus, the output from ramp schedule PROM 434 is functionally related to a derived stepping speed for the motor being addressed. Skip counter 102 logically combines input data to determine whether action should be taken by a motor. The operation of skip counter 102 is determined by a preload count which is provided from PROM 434. An overflow signal from skip counter 102 indicates that an action should be taken. It is apparent that the higher the preload number, the fewer the counts required to produce an overflow condition, and the faster the stepping speed of the motor will be.

Once an initial preload count has been provided to skip counter 102, however, counter data are incremented as skip counter clocking pulses arrive through AND gate 444. The incremented data are stored in RAM memories 342, 344 until the appropriate motor is next addressed.

Upon an appropriate state sequence signal, latch 98 is enabled to accept data from data bus 26 for latching into counter 102. Logic circuit components NOR gate 436, flip-flops 438 and 442, and NAND gates 440A, B determine the source of the preload count for counter 102. When PROM 434 is enabled to derive an output speed, the initial preload count is from PROM 434. Thereafter, the logic circuit disables the count from PROM 434 and enables the latched count in latch 98 to preload counter 102.

Ramping circuit 28 (FIG. 1) provides SKIP signal outputs at a rate which is functionally related to the desired maximum speed of the stepping motor. The stepping speed is incrementally increased or decreased to accelerate/decelerate the motor to the speed limits. Once a maximum operating speed in determined, RAM memories 342, 344 (FIG. 3) control the steady state operating speed until the motor is within a predetermined number of steps from completing its movement. Thereafter, PROM 434 is again enabled to decelerate the motor within the remaining steps. The motor data development circuitry 28 (FIG. 1) has now provided a phase data output indicative of a phase address and the direction in which the motor will turn to reach that phase address (see data outputs ADD0, ADD1, DATA IN in FIG. 1). Motor sequencer 36 outputs an address of the selected motor chip and a data bit selecting one of two motors from the selected motor chip.

Figure 16:
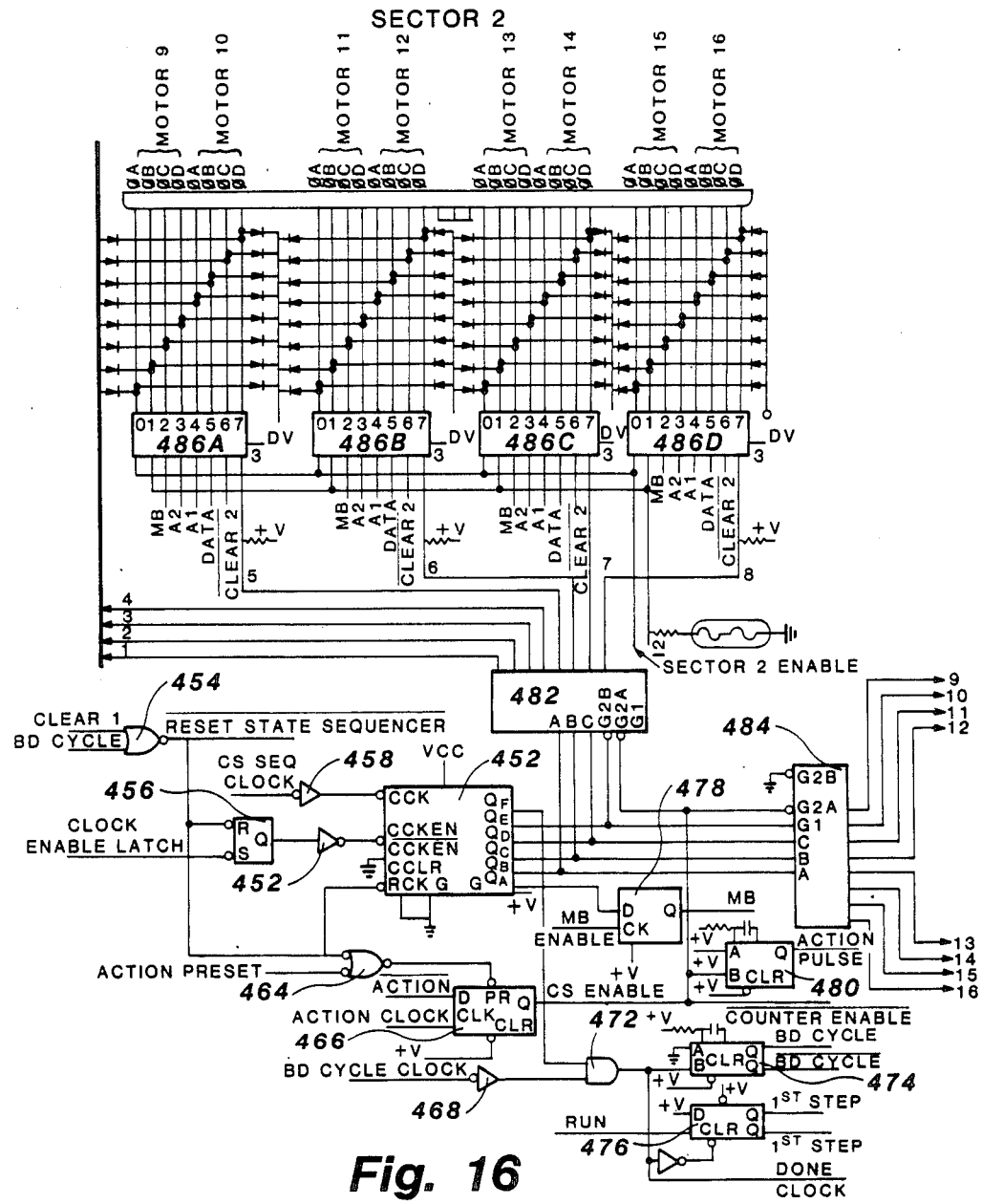
FIG. 16 is a schematic for the motor drivers depicted in FIG. 5.

FIG. 16 presents schematic circuitry showing one control sector for driving output motors. It will be appreciated that the motor and sector groupings herein discussed represent only one embodiment of the present invention and other combinations may obviously be obtained without limitation to the invention herein disclosed. Common to all of these sectors are components for sequantially addressing a motor to be stepped and input lines controlling the phase selection and currents.

A sector is first selected by an enablement signal, SEC (1, 2, 3 or 4) ENBL, from Latch Command PAL 50 (FIG. 6). Within a sector, with Sector 2 being illustrated in FIG. 16, a specific motor address is generated by sequential addressor 452, with clock signals input through amplifier 458 and a system status signal generated through OR gate 454, flip-flop 456, and inverting amplifier 462. The chip address generated by sequencer 452 is delivered to decoder units 482 (Sectors 1 and 2) and 484 (Sectors 3 and 4) to enable a specific chip.

It will be appreciated that no output is delivered to a motor unless an enabling signal is received from flip-flop 466, the CS ENABLE signal. The inputs to flip-flop 466 include a Preset input if the system is ready for action, an ACTION input indicating that the skip counter has determined that the addressed motor is to be stepped and a clock signal to synchronize the enabling output. The enabling output is provided to decoders 482 and 484 to combine with a specific chip address from sequencer 452, a SECTOR enable signal, and a motor bank MB signal to place a single motor in condition to take a single step. The phase information (A2, A1, DATA) is now provided through the selected motor phase output data decoder 486A, B, C, or D through the safety diodes to the selected motor. Thereafter, the motor takes one step in the indicated direction.

It should be recognized that the motor control system herein described may interface with a system, not herein described, for deriving the positions to which the step motors are to be stepped. Position data from this separate system can be interfaced with RAM memories 342 and 344 to enable enhanced control of step motor positions. In the described embodiment a total of 32 motors are controlled from a single circuit board layout. Up to six circuit boards have been combined to control 192 motors at an operating address rate of 40,000 addresses per second. Thus, a motor stepping rate of up to about 20,000 steps per second might be taken with 192 controlled motors, depending on the capabilities of the selected motors, where each motor has a unique set of operating parameters stored in the system RAM memories 342, 344. Stored data are logically combined for pipelining directly to effect motor movement, with the data reflecting the status of the moved motor being logically derived and returned to memory for storage and subsequent use.

The foregoing description of the preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A motor control system for sequentially controlling a plurality of stepper motors, including:
   addressing means for generating address data for each said motor in a periodic address sequence;
   memory means responsive to said address data for said each motor for accessing a memory location corresponding to said address data, said memory location containing a first data set functionally related to a direction for moving said motor, a number of steps remaining to move said motor, a speed for moving said number of steps, and a rate of change for said speed;
   first logic circuits for inputting said first data set and for outputting a second data set for commanding said motor to make a single step in a determined direction after a number of said periodic addresses;
   second logic circuits for inputting said second data set and for outputting a third data set funtionally related to a status of said motor is response to said second data set; and
   means for replacing said first data set with said third data set in said memory at said location corresponding to said address of said motor, said third data set becoming said first data set at a next said periodic addressing of said motor.

2. A motor control system according to claim 1, wherein said first logic circuit includes:
   a skip counter for counting said number of said periodic addresses and having an overflow output to cause said motor to move one of said number of steps;
   a PROM for receiving a portion of said first data set functionally related to a minimum and a maximum speed for said motor and to a predetermined incremental rate of change for said steps and deriving an output for preloading said skip counter with a number funtionally related to a stepping speed for said motor; and
   skip count latch means for holding a new count of said skip counter after each said periodic address to form a first portion of said third data set.

3. A motor control system according to claim 2, further including PAL means for logically outputting data indicative of a next phase state for said motor from input data indicative of a present phase state and direction for movement of said motor.

4. A motor control system according to claim 3, further including phase latch means for latching said next phase state data to form a second portion of said third data set at a time related to said overflow output of said skip counter.

5. A motor control system according to claim 2, wherein said first logic circuit includes:
   a counter decoding PAL having inputs functionally related to the number of steps taken by said motor and to skip count data and having outputs to indicate a proximity of said motor to a start and a stop position, to enable said preload into said skip counter after said overflow, and to indicate completion of motor movement as indicated by empty counter contents.

6. A motor control system according to claim 5, further including:
   ramping means for accepting a portion of said first data set functionally related to a first ramp level number and outputting data indicative of the number of said steps taken by said motor at said first ramp level number; and
   a ramp level PAL for changing said first ramp level number after a predetermined number of said steps at said first ramp level and in functional relationship to said outputs from said counter decoding PAL to form a second ramp level as a portion of said third data set.

7. A motor control system according to claim 1, further including:
   data bus means for transferring data within said control system; and
   sequencing means responsive to each said motor address for reading said first data set from said memory onto said data bus, latching data inputs to said first and second logic circuits, and writing said third data set into said memory in a predetermined sequence.

8. A method for simultaneously controlling a plurality of stepper motors, including the steps of:
   generating address data for each said motor in a periodic address sequence;
   accessing a memory location corresponding to said address data and containing a first data set functionally related to a direction for moving said motor, a number of steps remaining to move said motor, a speed for moving said number of steps, and a rate of change for said speed;
   inputting said first data set to first logic circuits;
   outputting from said first logic circuits a second data set for commanding said motor to make a single step in a determined direction after a number of said periodic addresses;

inputting said second data set to second logic circuits;

outputting from said second logic circuits a third data set functionally related to a status of said motor in response to said second data set; and replacing said first data set with said third data set in said memory at said location corresponding to said address of said motor, said third data set becoming said first data set at a next said periodic addressing of said motor.

9. A method according to claim 8, wherein said step of outputting said second data set includes the steps of:

counting said number of said periodic addresses in a skip counter;

generating a SKIP signal during said counting;

generating an overflow output when said skip counter is full effective to move said motor one of said number of steps;

inputting to a PROM a portion of said first data set functionally related to a minimum and a maximum speed for said motor and to a predetermined incremental rate of change for said steps;

deriving in said PROM an output for preloading said skip counter with a number functionally related to a stepping speed for said motor; and latching a new count of said skip counter after each said periodic address to form a first portion of said third data set.

10. A method according to claim 9, further including:

inputting data to a phase PAL indicative of a present phase state and direction for movement of said motor; and logically outputting data from said PAL indicative of a next phase state for said motor.

11. A method according to claim 10, further including latching said next phase state to form a second portion of said third data set at a time related to said overflow output of said skip counter.

12. A method according to claim 9, further including the steps of:

inputting to a counter decoding PAL data functionally related to the number of steps taken by said motor and to skip count data; and outputting from said counter decoding PAL data indicative of a proximity of said motor to a start and a stop position, a signal enabling said preload number into said skip counter after said overflow, and a signal indicative of completion of motor movement as indicated by empty counter contents.

13. A method according to claim 12, further including:

inputting to ramping circuit means a portion of said first data set functionally related to a first ramp level number;

outputting from said ramping circuit means data indicative of the number of said steps taken by said motor at said first ramp level number; and inputting to a ramp level PAL said number of steps taken at said first ramp level number; and incrementing said first ramp level numer after a predetermined number of said steps at said first ramp level number and in functional relationship to said outputs from said counter decoding PAL to form a second ramp level number as a portion of said third data set.

14. A method according to claim 8, further including: transferring data on a data bus means; and sequencing said data bus means in response to each said motor address for reading said first data set from said memory onto said data bus, for latching data inputs to said first and second logic circuits, and for writing said third data set into said memory in a predetermined sequence.

15. A motor control system for simultaneously controlling a plurality of stepper motors, including:

memory means defining a memory location for each of said plurality of motors for storing a first data set functionally related to an operational status of each said motor;

a first plurality of PAL circuits for manipulating said first data set according to predetermined logic to derive a second data set for moving each said motor;

logic means for combining said second data set with said first data set to derive a third data set functionally related to a revised operational status of each said motor; and writing means for replacing said first data set in said memory with said third data set.

16. A system according to claim 15, wherein said first plurality of PAL circuits includes:

a ramp level PAL for deriving a subsequent ramp level number after a predetermined number of motor steps taken at a present ramp level number;

a phase error PAL for deriving an error signal indicative of bad phase state data; and a next phase PAL for deriving motor phase state data for storage at said motor memory location.

17. A system according to claim 15, wherein said means for combining said second data set with said first data set includes:

a plurality of data latches; and means for enabling said first plurality of PAL circuits and said plurality of data latches in a sequence effective to derive said third data set.

18. A system according to claim 16, wherein said means for combining said second data set with said first data set includes:

a plurality of data latches; and means for enabling said first plurality of PAL circuits and said plurality of data latches in a sequence effective to derive said third data set.

19. A system according to claim 15, further including:

means for sampling said control system for status and fault data; and a second plurality of PAL circuits for receiving said status and fault data and deriving command signals for said control system according to a predetermined logic.

20. A system according to claim 15, further including motor driver means responsive to said second data set for energizing a combination of motor phases to move said motor one step in a determined direction.

21. A system according to claim 16, further including a PROM for deriving motor speed data responsive to said ramp level number as a portion of said second set of data.

22. A system according to claim 21, further including counter means for outputting a proximity signal, functionally related to an end position of said motor, to said ramp level PAL to decrease said ramp level number and slow said motor.

23. In a control system for moving a stepping motor from a first position to a second position, an improved system for motor speed control, comprising;

counter means having an output functionally related to the number of steps made by said stepping motor at a first motor speed;

a ramp level PAL having at least said counter output as said input and generating a ramp level number functionally related to a position of said motor relative to said first position and to said second position; and a ramp PROM having at least said ramp level number as input and deriving an output functionally determining said first motor speed to accelerate said motor in a first proximity to said first position and to decelerate said motor in a second proximity to said second position.

24. A motor speed control system according to claim 23, further including:

minimum motor speed input means for defining a starting speed for said ramp PROM; and maximum motor speed input means for defining a steady state speed for said motors and defining a data base for said PROM in deriving changes in said motor speed as a function of said ramp level number.

25. A motor speed control system according to claim 23, further including:

overflow counter means for generating an action signal when said overflow counter is filled; and circuit means for preloading said overflow counter with a count level functionally related to said ramp PROM output.

26. A motor speed control system according to claim 25, further including:

motor driver means responsive to said action signal for moving said stepping motor one step.

27. A motor speed control system according to claim 23, further including:

a data decoding PAL having at least one input functionally related to a number of steps taken by said motor, and outputting at least one flag effective to increment or decrement said ramp level number.

28. In a control system for moving a stepping motor from a first position to a second position, an improved system for motor speed control, comprising;

counter means having an output functionally related to the number of steps made by said stepping motor at a first motor speed;

a ramp level PAL having at least said counter output as said input and generating a ramp level number functionally related to a position of said motor relative to said first position and to said second position;

a ramp PROM having at least said ramp level number as input and deriving an output functionally determining said first motor speed to accelerate said motor in a first proximity to said first position and to decelerate said motor in a second proximity to said second position;

overflow counter means for generating an action signal when said overflow counter is filled;

circuit means for preloading said overflow counter with a count level functionally related to said ramp PROM output;

minimum motor speed input means for defining a starting speed for said ramp PROM; and maximum motor speed input means for defining a steady state speed for said motors and defining a data base for said PROM in deriving changes in said motor speed as a function of said ramp level number.

29. A motor speed control system according to claim 28, further including:

a data decoding PAL having at least one input functionally related to a number of steps taken by said motor, and outputting at least one flag effective to increment or decrement said ramp level number.

30. A motor speed control system according to claim 28, further including:

motor driver means responsive to said action signal for moving said stepping motor one step.

* * * * *